(12) United States Patent
Matsuoka et al.

(10) Patent No.: US 11,739,990 B2
(45) Date of Patent: Aug. 29, 2023

(54) CHILLER WITH AN OUTDOOR UNIT TRANSFERRING HEAT TO AN INDOOR UNIT USING CARBON DIOXIDE

(71) Applicant: DAIKIN INDUSTRIES, LTD., Osaka (JP)

(72) Inventors: Hiromune Matsuoka, Osaka (JP); Ryuusuke Fujiyoshi, Osaka (JP); Kyou Tomikawa, Osaka (JP); Yoshihiko Hagiwara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/677,262

(22) Filed: Feb. 22, 2022

(65) Prior Publication Data

US 2022/0178591 A1    Jun. 9, 2022

Related U.S. Application Data

(63) Continuation of application No. 16/625,315, filed as application No. PCT/JP2018/023350 on Jun. 19, 2018, now Pat. No. 11,293,670.

(Continued)

(51) Int. Cl.
*F25B 7/00* (2006.01)
*F25B 13/00* (2006.01)
(Continued)

(52) U.S. Cl.
CPC ............... *F25B 7/00* (2013.01); *F25B 13/00* (2013.01); *F25B 29/003* (2013.01);
(Continued)

(58) Field of Classification Search
CPC .......... F25B 7/00; F25B 31/026; F25B 13/00; F25B 29/003; F25B 2313/0231;
(Continued)

(56) References Cited

U.S. PATENT DOCUMENTS 5,784,893 A * 7/1998 Furuhama ............ C09K 5/041
62/434
5,966,947 A * 10/1999 Kamimura ............ F24F 3/065
62/468

(Continued)

FOREIGN PATENT DOCUMENTS

CN       203704422 U    7/2014
EP       2910870 A1     8/2015
(Continued)

OTHER PUBLICATIONS

Translation of Spec for JP H11 294879.*
(Continued)

*Primary Examiner* — Henry T Crenshaw
(74) *Attorney, Agent, or Firm* — Osha Bergman Watanabe & Burton LLP

(57) ABSTRACT

A heat transport system includes: a refrigerant circuit that seals therein a fluid including HFC-32 and/or HFO refrigerant as a refrigerant and that includes a refrigerant booster that boosts the refrigerant, an outdoor air heat exchanger that exchanges heat between the refrigerant and outdoor air, a medium heat exchanger that exchanges heat between the refrigerant and a heat transfer medium, and a refrigerant flow path switch that switches between a refrigerant radiation state and a refrigerant evaporation state; and a medium circuit that seals carbon dioxide therein as the heat transfer medium.

8 Claims, 21 Drawing Sheets

Related U.S. Application Data

(60) Provisional application No. 62/524,091, filed on Jun. 23, 2017.

(51) Int. Cl.
 *F25B 29/00* (2006.01)
 *F25B 31/02* (2006.01)

(52) U.S. Cl.
 CPC ........ *F25B 31/026* (2013.01); *F25B 2309/06* (2013.01); *F25B 2313/0231* (2013.01); *F25B 2313/0233* (2013.01); *F25B 2600/021* (2013.01); *F25B 2600/0253* (2013.01); *F25B 2600/2507* (2013.01)

(58) Field of Classification Search
 CPC ........ F25B 2600/2507; F25B 2600/021; F25B 2600/0253; F25B 2309/06; F25B 2313/0233
 See application file for complete search history.

(56) References Cited

U.S. PATENT DOCUMENTS

| | | | |
|---|---|---|---|
| 2006/0070391 A1* | 4/2006 | Park | F25B 7/00 62/324.1 |
| 2007/0022777 A1* | 2/2007 | Takegami | F25B 40/02 62/332 |
| 2009/0038150 A1* | 2/2009 | Kishikawa | B23K 26/282 219/121.85 |
| 2011/0236245 A1* | 9/2011 | Sato | F04C 29/026 418/266 |
| 2012/0285186 A1* | 11/2012 | Honda | F25B 7/00 62/157 |
| 2014/0352336 A1* | 12/2014 | Rached | F25B 49/02 62/190 |
| 2015/0285545 A1* | 10/2015 | Yamashita | F25B 49/02 62/196.1 |

FOREIGN PATENT DOCUMENTS

| | | |
|---|---|---|
| EP | 3124890 A1 | 2/2017 |
| JP | S4921332 B1 | 5/1974 |
| JP | H0339869 A | 2/1991 |
| JP | H0378598 A | 4/1991 |
| JP | H07269964 A | 10/1995 |
| JP | 2621687 B2 | 6/1997 |
| JP | H11294879 A | 10/1999 |
| JP | 2005180866 A | 7/2005 |
| JP | 200820083 A | 1/2008 |
| JP | 2009222363 A | 10/2009 |
| JP | 2015505029 A | 2/2015 |
| JP | 5800994 B2 | 10/2015 |
| JP | 201644892 A | 4/2016 |
| JP | 2017032184 A | 2/2017 |
| WO | 2014/045400 A1 | 3/2014 |
| WO | 2014097439 A1 | 6/2014 |

OTHER PUBLICATIONS

International Search Report issued in corresponding International Application No. PCT/JP2018/023350, dated Sep. 11, 2018, with translation (4 pages).
Written Opinion issued in corresponding International Application No. PCT/JP2018/023350, dated Sep. 11, 2018 (7 pages).
Notification of Transmiflal of Translation of the International Preliminary Report on Patentability issued in corresponding International Application No. PCT/JP2018/023350, dated Jan. 2, 2020 (1 page).
International Preliminary Report on Patentability issued in corresponding International Application No. PCT/JP2018/023350, dated Dec. 24, 2019 (12 pages).
Extended European Search Report issued in corresponding European Patent Application No. 18819903.8, dated Jun. 1, 2020 (7 pages).
Extended European Search Report issued in corresponding European Patent Application No. 22157715.8 dated May 9, 2022 (7 pages).

* cited by examiner

CHILLER WITH AN OUTDOOR UNIT TRANSFERRING HEAT TO AN INDOOR UNIT USING CARBON DIOXIDE

CROSS-REFERENCE TO RELATED APPLICATIONS

The present application is a continuation application of and, thereby, claims benefit under 35 U.S.C. § 120 to U.S. patent application Ser. No. 16/625,315 filed on Dec. 20, 2019, titled "CHILLER WITH AN OUTDOOR UNIT TRANSFERRING HEAT TO AN INDOOR UNIT USING CARBON DIOXIDE," which claims benefit to U.S. Provisional Patent Application No. 62/524,091 filed on Jun. 23, 2017. The contents of the priority applications are incorporated by reference in their entirety.

TECHNICAL FIELD

The present invention relates to a heat transport system.

BACKGROUND

In the prior art, there has been provided a chiller system having a refrigerant circuit and a water circuit, and configured to transfer heat from the refrigerant to water by performing heat exchange between water circulating in the water circuit and the refrigerant circulating in the refrigerant circuit.

The aforementioned conventional chiller system may be used for indoor air conditioning by providing a water circuit including a heat exchanger to exchange heat between water and indoor air. However, in such a heat transport system, it is necessary to install a water pipe constituting the water circuit to the interior of the room. Unfortunately, the pipe diameter of the water piping is large; hence, a large installation space is required and the installation and maintenance thereof takes time and effort.

On the other hand, omitting the water circuit and disposing a heat exchanger for exchanging heat between the indoor air and refrigerant in the refrigerant circuit inside the room instead is conceivable. Nonetheless, if this configuration is adopted, there is a risk that when the refrigerant leaks inside the room, all the refrigerant sealed in the refrigerant circuit may leak into the room because the refrigerant is circulated to the interior of the room. Here, as the refrigerant to be sealed within the refrigerant circuit, there is a requirement to use a refrigerant having a low global warming potential and an ozone layer destruction coefficient of zero, in addition to having superior refrigerating capacity, in order to reduce recent environmental load (ozone layer destruction and global warming). However, many fluids that can satisfy these characteristics are combustible or slightly combustible. If a heat exchanger for exchanging heat between the refrigerant and indoor air is enclosed in a refrigerant circuit disposed indoors, there is a risk that the concentration of the refrigerant in the room increases to a combustible concentration when there is refrigerant leakage in the room, and therefore may cause an ignition accident.

SUMMARY

One or more embodiments of the present invention provide a chiller system (heat transport system) including a refrigerant circuit through which refrigerant circulates and a water circuit (medium circuit) through which water (heat transfer medium) circulates for performing air conditioning of a room by performing heat exchange between a heat transfer medium and indoor air, whereby the environmental load is reduced, safety is improved, and the pipe diameter of a pipe constituting the medium circuit is reduced as well.

A heat transport system according to one or more embodiments of the present invention includes a refrigerant circuit and a medium circuit. The refrigerant circuit includes a refrigerant booster (i.e., refrigerant compressor), an outdoor air heat exchanger, a medium heat exchanger, and a refrigerant flow path switching device (refrigerant flow path switch). The refrigerant booster is a device for boosting the refrigerant. The outdoor air heat exchanger is a device for exchanging heat between the refrigerant and the outdoor air. The medium heat exchanger is a device for exchanging heat between the refrigerant and a heat transfer medium. The refrigerant flow path switching device is a device for switching between a refrigerant radiation state and a refrigerant evaporation state, wherein the outdoor air heat exchanger functions as a radiator of the refrigerant and the medium heat exchanger functions as an evaporator of the refrigerant in the refrigerant radiation state, and the outdoor air heat exchanger functions as an evaporator of the refrigerant and the medium heat exchanger functions as a radiator of the refrigerant in the refrigerant evaporation state. In the refrigerant circuit, a fluid containing HFC-32 and/or HFO refrigerant is sealed therein as the refrigerant. Here, "containing HFC-32 and/or HFO refrigerant" means that any one of the following cases are acceptable: a case in which only HFC-32 is sealed in the refrigerant circuit; a case in which only HFO refrigerant is sealed in the refrigerant circuit; or a case in which a mixture of HFC-32 and HFO refrigerant is sealed in the refrigerant circuit. The medium circuit includes a medium booster (i.e., medium compressor), a medium heat exchanger, a first medium flow path switching device (first medium flow path switch), and a plurality of indoor air heat exchangers. The medium booster is a device for boosting the heat transfer medium. The first medium flow path switching device is a device for switching between a first medium radiation state which causes the medium heat exchanger to function as a radiator of the heat transfer medium and a first medium evaporation state which causes the medium heat exchange to function as an evaporator of the heat transfer medium. The indoor air heat exchanger is a device for exchanging heat between the heat transfer medium and the indoor air. Carbon dioxide is sealed in the medium circuit as the heat transfer medium.

Here, the refrigerant flow path switching device is switched to the refrigerant radiation state so that the refrigerant in the refrigerant circuit is circulated, and the first medium flow path switching device is switched to the first medium radiation state as well so that the heat transfer medium in the medium circuit is circulated. In this case, in the medium heat exchanger, the heat transfer medium radiates heat due to the evaporation of the refrigerant, thereby transferring cold heat from the refrigerant circuit to the medium circuit. Furthermore, it is possible that the refrigerant flow path switching device is switched to the refrigerant evaporation state so that the refrigerant in the refrigerant circuit is circulated, and the first medium flow path switching device is switched to the first medium evaporation state as well so that the heat transfer medium in the medium circuit can be circulated. In this case, in the medium heat exchanger, the heat transfer medium is evaporated by the radiation of the refrigerant, thereby transferring hot heat from the refrigerant circuit to the medium circuit. Here, this configuration allows the operation of transferring cold heat from the refrigerant circuit to the medium circuit and the operation of transferring hot heat from the refrigerant circuit to the medium circuit to be switched and performed by the refrigerant flow path switching device provided in the refrigerant circuit and the first medium flow path switching device provided in the medium circuit. Next, the cold or hot heat transferred from the refrigerant circuit to the medium circuit in the above described operation is further transferred into the indoor air by the heat exchange between the indoor air and the heat transfer medium in the indoor air heat exchanger, thus indoor air conditioning (cooling and heating) can be performed.

In addition, in performing the above operation, the pipe diameter of the pipe constituting the medium circuit can be reduced since carbon dioxide is used as the heat transfer medium, as compared with the case where water is used as the heat transfer medium. With this configuration, when installing the pipe constituting the medium circuit to the interior of a room (in this case, the indoor air heat exchanger), it is possible to reduce the installation space and the labor of piping installation and maintenance thereof. In addition, the amount of the heat transfer medium sealed in the medium circuit can be reduced.

Although a fluid containing HFC-32 and/or HFO refrigerant is used as the refrigerant here, the risk of the refrigerant leaking into the room can be eliminated even if the refrigerant leaks from the refrigerant circuit since it is not necessary to install the pipe constituting the refrigerant circuit to the interior of the room. Moreover, although the pipe constituting the medium circuit is installed to the interior of the room as described above, even if the heat transfer medium leaks from the medium circuit, only incombustible carbon dioxide leaks into the room and therefore the possibility of causing an ignition accident can be eliminated.

Furthermore, here, both HFC-32 and/or HFO refrigerant used as the refrigerant and carbon dioxide used as the heat transfer medium have a zero-ozone layer destruction coefficient and are liquids with a low global warming potential; therefore capable of satisfying the requirement of reducing the environmental load.

Given these factors, the heat transport system has a refrigerant circuit through which the refrigerant circulates and a medium circuit through which the heat transfer medium circulates, and performs heat exchange of the heat transfer medium with the indoor air to perform indoor air conditioning. Thereby making it possible to reduce the pipe diameter of the pipe constituting the medium circuit and to reduce the environmental load and improve safety as well.

In a heat transport system according to one or more embodiments of the present invention, the pipe diameter of the pipe constituting the medium circuit is ⅜ inch or less when the rated capacity of the heat transport system is 5 horsepower or less. Herein, "rated capacity" means a value equivalent to "nominal capacity" described in the product catalog or instruction manual.

In this aspect, setting the pipe diameter of the pipe constituting the medium circuit to ⅜ inch or less makes it possible to perform piping construction within a narrow space, and the amount of the heat transfer medium sealed in the medium circuit can be further reduced.

In a heat transport system according to one or more embodiments of the present invention, the refrigerant circuit, the medium booster, and the first medium flow path switching device are located in a heat transfer unit disposed outside a room (i.e., outdoor unit), and the indoor air heat exchanger is located in a utilization unit disposed inside the room (i.e., indoor unit).

In this aspect, the refrigerant circuit is located in the heat transfer unit disposed outdoors and therefore the risk of the refrigerant leaking into the room can be reliably eliminated even if the refrigerant leaks from the refrigerant circuit. Regarding the medium circuit, although the indoor air heat exchanger is located in the utilization unit disposed in the room, the medium booster and the first medium flow path switching device are provided in the heat transfer unit. This allows many of the devices that constitute the heat transport system to be collectively arranged outdoors, thus minimizing the devices disposed inside the room and achieving compactness of the utilization units.

In a heat transport system according to one or more embodiments of the present invention, the heat transfer unit includes an air cooling unit including the refrigerant circuit, and a heat source unit including the medium booster and the first medium flow path switching device.

In this aspect, since the refrigerant circuit is provided in the air cooling unit, and the part of the medium circuit in the heat transfer unit except the medium heat exchanger is provided in the heat source unit, the heat transfer unit can be easily configured by connecting the air cooling unit and the heat source unit via a pipe through which the heat transfer medium flows.

In a heat transport system according to one or more embodiments of the present invention, the medium booster has a motor whose rotation speed is controlled by an inverter.

In this aspect, the flow rate of the heat transfer medium circulating the medium circuit can be controlled in accordance with the variation in the number of indoor air heat exchangers that perform heat exchange between the heat transfer medium and the indoor air.

In a heat transport system according to one or more embodiments of the present invention, the medium booster is a rotary compressor.

In this aspect, a rotary compressor having a proven experience in a heat pump water heater, etc. using carbon dioxide is used as the medium booster; thus, making it possible to configure a highly reliable medium circuit.

In a heat transport system according to one or more embodiments of the present invention, the medium booster is an oil-less turbo compressor. Examples of the oil-less turbo compressor include those having a structure in which a rotating shaft connecting an impeller and a motor is supported by a magnetic bearing or a gas bearing.

In this aspect, using the oil-less turbo compressor as the medium booster makes it possible to reduce the oil used in the medium circuit, and thereby omitting the evacuation operation when constructing the medium circuit. In addition, it is not necessary to take into consideration the accumulation of the lubricating oil in the medium circuit, allowing free arrangement of the pipe constituting the medium circuit.

In a heat transport system according to one or more embodiments of the present invention, the first medium flow path switching device causes the indoor air heat exchanger to function as an evaporator of the heat transfer medium in the first medium radiation state and causes the indoor air heat exchanger to function as a radiator of the heat transfer medium in the first medium evaporation state.

In this aspect, when circulating the heat transfer medium in the medium circuit with the first medium flow path switching device being switched to the first medium radiation state, all the indoor air heat exchangers function as evaporators of the heat transfer medium. Therefore, in the indoor air heat exchanger, indoor air is cooled through the heat exchange between the heat transfer medium and the indoor air, thereby cooling the room. In the case of circulating the heat transfer medium in the medium circuit with the first medium flow path switching device being switched to the first medium evaporation state, all the indoor air heat exchangers function as radiators of the heat transfer medium. Therefore, in the indoor air heat exchanger, the indoor air is heated through heat exchange between the heat transfer medium and the indoor air, thereby heating the room. With this configuration, the refrigerant flow path switching device provided in the refrigerant circuit and the first medium flow path switching device provided in the medium circuit enables all the indoor air heat exchangers to be collectively switched to thereby perform the operation of cooling or heating a room.

In a heat transport system according to one or more embodiments of the present invention, the medium circuit further includes a second medium flow path switching device (second medium flow path switch) for each of the indoor air heat exchangers. The second medium flow path switching device switches between a second medium evaporation state which causes the indoor air heat exchanger to function as an evaporator of the heat transfer medium and a second medium radiation state which causes the indoor heat exchanger to function as a radiator of the heat transfer medium.

In this aspect, when circulating the heat transfer medium in the medium circuit with the first medium flow path switching device being switched to the first medium radiation state or the second medium radiation state, and when the second medium flow path switching device is switched to the second medium evaporation state, the indoor air heat exchanger corresponding thereto functions as an evaporator of the heat transfer medium. Therefore, in the indoor air heat exchanger corresponding to the second medium flow path switching device being switched to the second medium evaporation state, the indoor air is cooled through the heat exchange between the heat transfer medium and the indoor air, thereby cooling the room. In addition, when circulating the heat transfer medium in the medium circuit with the first medium flow path switching device being switched to the first medium radiation state or the second medium radiation state, and when the second medium flow path switching device is switched to the second medium radiation state, the indoor air heat exchanger corresponding thereto functions as a radiator of the heat transfer medium. Therefore, in the indoor air heat exchanger corresponding to the second medium flow path switching device being switched to the second medium radiation state, the indoor air is heated through the heat exchange between the heat transfer medium and the indoor air, thereby heating the room. Here, with this configuration, the refrigerant flow path switching device provided in the refrigerant circuit and the first medium flow path switching device provided in the medium circuit enables the indoor air heat exchangers to be individually switched to thereby perform the operation of cooling or heating a room.

In a heat transport system according to one or more embodiments of the present invention, the medium circuit further includes a receiver for storing the heat transfer medium circulating through the medium circuit.

In this aspect, the operation of transferring cold heat from the refrigerant circuit to the medium circuit and the operation of transferring hot heat from the refrigerant circuit to the medium circuit are switched and performed, and therefore the distribution of the heat transfer medium in the medium circuit is different between both operations. Thus, a surplus of heat transfer medium is generated in the medium circuit between the two operations. This surplus heat transfer medium accumulates in the medium heat exchanger and in the indoor air heat exchanger, possibly causing a decline in the performance of heat exchange.

Given this situation, a receiver is provided in the medium circuit to store the surplus heat transfer medium to prevent the surplus heat transfer medium from accumulating in the medium heat exchanger and in the indoor air heat exchanger, thereby decreasing the deterioration of the heat exchange performance of both the medium heat exchanger and the indoor air heat exchanger.

DETAILED DESCRIPTION

Hereinafter, detailed description of embodiments of a heat transport system according to the present invention and Modifications thereof will be described with reference to the accompanying drawings. Note that the specific configuration of the heat transport system according to the present invention is not limited to the following embodiments and Modifications thereof, but modifications can be made herein without departing from the scope of the invention as defined in the appended claims.

Configuration

Figure 1:
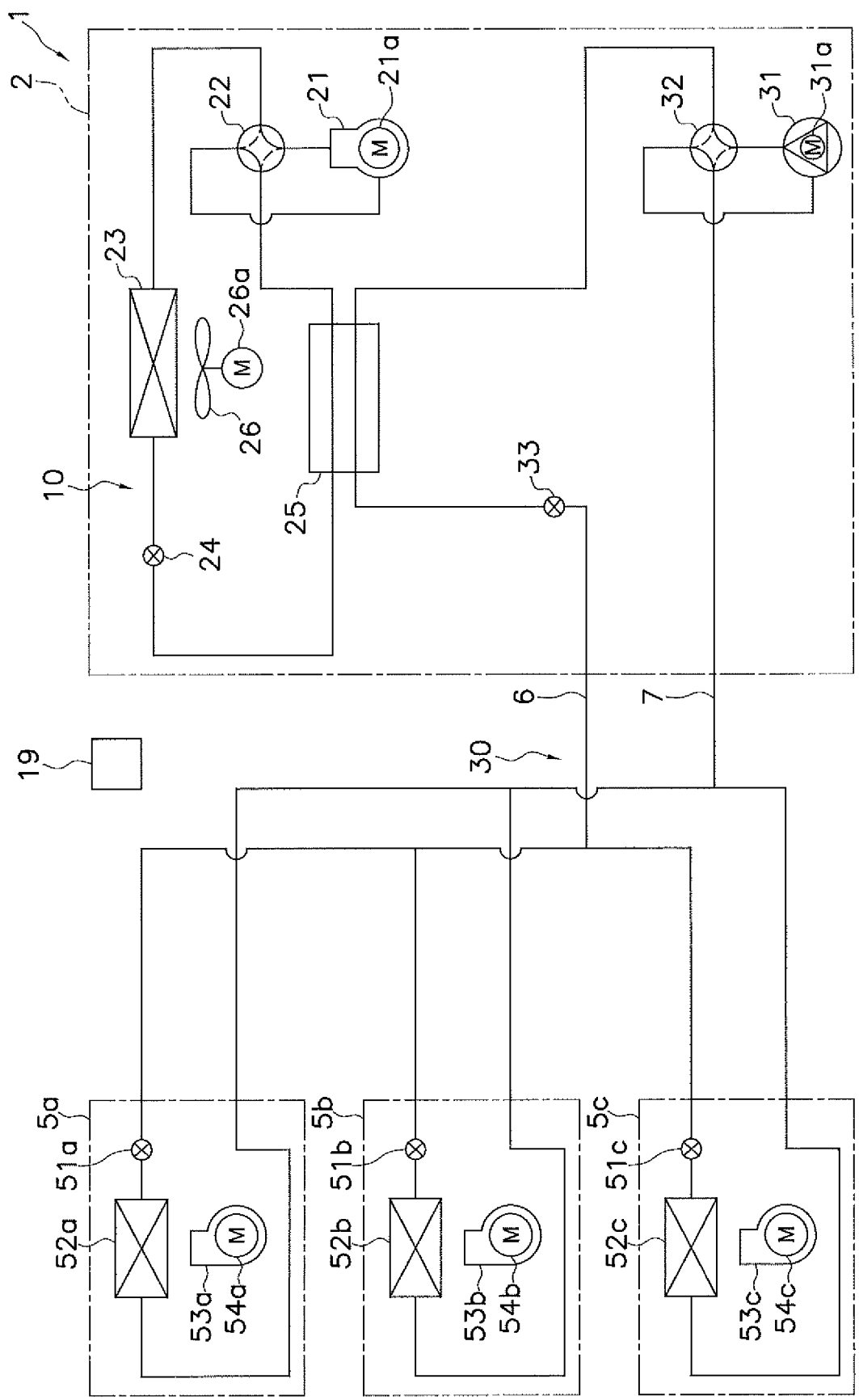
FIG. 1 is a schematic configuration diagram of a heat transport system according to one or more embodiments of the present invention.

FIG. 1 is a schematic configuration diagram of a heat transport system 1 according to one or more embodiments of the present invention.

The heat transport system 1 is a device for performing air conditioning (cooling and heating) in a room by exchanging heat between a heat transfer medium and indoor air; and includes a refrigerant circuit 10 through which the refrigerant circulates, and a medium circuit 30 through which the heat transfer medium circulates.

The refrigerant circuit 10 mainly includes a refrigerant booster 21, an outdoor air heat exchanger 23, a medium heat exchanger 25, and a refrigerant flow path switching device 22. A fluid containing HFC-32 and/or HFO refrigerant is sealed as the refrigerant in the refrigerant circuit 10. Here, "containing HFC-32 and/or HFO refrigerant" means that any one of the following cases are acceptable: a case in which only HFC-32 is sealed in the refrigerant circuit 10; a case in which only HFO refrigerant is sealed in the refrigerant circuit 10; or a case in which a mixture of HFC-32 and HFO refrigerant is sealed in the refrigerant circuit 10. Refrigerants such as HFO-1234yf or HFO-1234ze can be used as the HFO refrigerant.

The refrigerant booster 21 is a device for boosting the refrigerant. The refrigerant booster 21 is, for example, a compressor for driving a positive displacement type refrigerant compression component (not shown) such as a rotary or a scroll by means of a refrigerant booster driving mechanism 21a, which is a motor. Note that the refrigerant compression component constituting the refrigerant booster 21 is not limited to the positive displacement type compression component such as a rotary or a scroll, but may be a compression component of another type (reciprocal, etc.).

Further, the refrigerant booster driving mechanism 21a is not limited to a motor, but may be another driving mechanism (such as an engine).

The refrigerant flow path switching device 22 is a device for switching between the refrigerant radiation state and the refrigerant evaporation state, wherein the outdoor air heat exchanger 23 functions as a radiator of the refrigerant and the medium heat exchanger 25 functions as an evaporator of the refrigerant in the refrigerant radiation state (refer to the solid line of the refrigerant flow path switching device 22 in FIG. 1), and the outdoor air heat exchanger 23 functions as an evaporator of the refrigerant and the medium heat exchanger 25 functions as a radiator of the refrigerant in the refrigerant evaporation state (refer to the broken line of the refrigerant flow path switching device 22 in FIG. 1). The refrigerant flow path switching device 22 is, for example, a four-way switching valve. In the refrigerant radiation state, the refrigerant flow path switching device 22 connects the discharge side of the refrigerant booster 21 to the gas refrigerant side of the outdoor air heat exchanger 23, and connects the suction side of the refrigerant booster 21 to the gas refrigerant side of the medium heat exchanger 25. In the refrigerant evaporation state, the refrigerant flow path switching device 22 connects the discharge side of the refrigerant booster 21 to the gas refrigerant side of the medium heat exchanger 25, and connects the suction side of the refrigerant booster 21 to the gas refrigerant side of the outdoor air heat exchanger 23. It should be noted that the refrigerant flow path switching device 22 is, but not limited to a four-way switching valve, but may be a combination of a plurality of valves (a solenoid valve, a three-way valve, etc.) configured to have the function of switching between the above-mentioned refrigerant radiation state and the refrigerant evaporation state.

The outdoor air heat exchanger 23 is a device for exchanging heat between the refrigerant and outdoor air. The outdoor air heat exchanger 23 is, for example, a fin-and-tube heat exchanger. The outdoor air heat exchanger 23 functions as a radiator of the refrigerant using the outdoor air as a cooling source in a state in which the refrigerant flow path switching device 22 is switched to the refrigerant radiation state, and functions as an evaporator of the refrigerant using the outdoor air as a heating source in a state in which the refrigerant flow path switching device 22 is switched to the refrigerant evaporation state. The gas refrigerant side of the outdoor air heat exchanger 23 is connected to the refrigerant flow path switching device 22, and the liquid refrigerant side of the outdoor air heat exchanger 23 is connected to the liquid refrigerant side of the medium heat exchanger 25.

Further, the refrigerant circuit 10 includes a refrigerant decompressor 24. The refrigerant decompressor 24 is a device for decompressing the refrigerant. The refrigerant decompressor 24 is, for example, an electric expansion valve. The refrigerant decompressor 24 decompresses the refrigerant that has radiated heat in the outdoor air heat exchanger 23 in a state where the refrigerant flow path switching device 22 is switched to the refrigerant radiation state, and decompresses the refrigerant that has radiated heat in the medium heat exchanger 25 in a state where the refrigerant flow path switching device 22 is switched to the refrigerant evaporation state. One end of the refrigerant decompressor 24 is connected to the liquid refrigerant side of the outdoor air heat exchanger 23 and the other end is connected to the liquid refrigerant side of the medium heat exchanger 25. Note that the refrigerant decompressor 24 is not limited to an electric expansion valve, but may be another expansion valve, a capillary tube, or an expander, for example.

The medium heat exchanger 25 is a device for exchanging heat between the refrigerant and the heat transfer medium. The medium heat exchanger 25 is, for example, a plate type or a double tube type heat exchanger. The medium heat exchanger 25 functions as an evaporator of the refrigerant using the heat transfer medium as a heating source in a state in which the refrigerant flow path switching device 22 is switched to the refrigerant radiation state; and functions as a radiator of the refrigerant using the heat transfer medium as the cooling source in a state where the refrigerant flow path switching device 22 is switched to the refrigerant evaporation state. The gas refrigerant side of the medium heat exchanger 25 is connected to the refrigerant flow path switching device 22 whereas its liquid refrigerant side is connected to the liquid refrigerant side of the medium heat exchanger 25 via the refrigerant decompressor 24. It should be noted that the medium heat exchanger 25 is not limited to a plate type or double tube type heat exchanger, but may be a heat exchanger of another type (shell and tube type etc.).

The medium circuit 30 mainly includes a medium booster 31, the medium heat exchanger 25, a first medium flow path switching device 32, a plurality of indoor air heat exchangers 52a, 52b, and 52c (three, in this case). Carbon dioxide is sealed in the medium circuit 30 as the heat transfer medium. Note that the number of indoor air heat exchangers 52a, 52b, and 52c is not limited to three, but may be two or four or more.

The medium booster 31 is a device for boosting the heat transfer medium. The medium booster 31 is a compressor that is positive displacement type medium compression component (not shown) such as a rotary or a scroll driven by a medium booster driving mechanism 31a, which is a motor. It should be noted that the medium compression component constituting the medium booster 31 is not limited to a positive displacement type compression component such as rotary or a scroll, but may be a compression component of another type (reciprocal or the like). Further, the medium booster driving mechanism 31a is not limited to a motor, but may be another driving mechanism (an engine or the like).

The first medium flow path switching device 32 is a device for switching between a first medium radiation state (refer to the solid line of the first medium flow path switching device 32 in FIG. 1) which causes the medium heat exchanger 25 to function as a radiator of the heat transfer medium, and a first medium evaporation state (refer to the broken line of the first medium flow path switching device 32 in FIG. 1) which causes the heat exchanger 25 to function as an evaporator of the heat transfer medium. Further, the first medium flow path switching device 32 causes the indoor air heat exchangers 52a, 52b, and 52c to function as evaporators of the heat transfer medium in the first medium radiation state; and causes the indoor air heat exchangers 52a, 52b, and 52c to function as radiators of the heat transfer medium in the first medium evaporation state. The first medium flow path switching device 32 is, for example, a four-way switching valve. In the first medium radiation state, the first medium flow path switching device 32 connects the discharge side of the medium booster 31 to the gas heat transfer medium side of the medium heat exchanger 25, and also connects the suction side of the medium booster 31 to the gas heat transfer medium side of the indoor air heat exchangers 52a, 52b, and 52c. In the first medium evaporation state, the first medium flow path switching device 32 connects the discharge side of the medium booster 31 to the gas heat transfer medium side of the indoor air heat exchangers 52a, 52b, and 52c, and also connects the suction side of the medium booster 31 to the gas heat transfer medium side of the medium heat exchanger 25. Note that the first medium flow path switching device 32 is not limited to a four-way switching valve. For example, a configuration may be adopted in which a combination of a plurality of valves (a solenoid valve, a three-way valve, etc.) configured to have the function of switching between the above-described first medium radiation state and the first medium evaporation state.

The medium heat exchanger 25 functions as a radiator of the heat transfer medium using the refrigerant as a cooling source in a state in which the refrigerant flow path switching device 22 is switched to the refrigerant radiation state and the first medium flow path switching device 32 is switched to the first medium radiation state; and functions as an evaporator of the heat transfer medium using the refrigerant as a heating source in a state where the refrigerant flow path switching device 22 is switched to the refrigerant evaporation state and the first medium flow path switching device 32 is switched to the first medium evaporation state. The medium heat exchanger 25 is, for example, a plate type heat exchanger or a double tube type heat exchanger. The medium heat exchanger 25 is connected to the first medium flow path switching device 32 on the gas heat transfer medium side, and its liquid heat transfer medium side is connected to the liquid heat transfer medium side of the indoor air heat exchangers 52a, 52b, and 52c.

Further, the medium circuit 30 has a heat source side medium decompressor 33. The heat source side medium decompressor 33 is a device for decompressing the heat transfer medium. The heat source side medium decompressor 33 is, for example, an electric expansion valve. In a state in which the first medium flow path switching device 32 is switched to the first medium radiation state, the heat source side medium decompressor 33 reduces the possibility that the heat transfer medium that has radiated heat in the fully opened medium heat exchanger 25 is decompressed as much as possible; whereas when in the state in which the first medium flow path switching device 32 is switched to the first medium evaporation state, the heat source side medium decompressor 33 decompresses the heat transfer medium that has radiated heat in the indoor air heat exchangers 52a, 52b, and 52c. One end of the heat source side medium decompressor 33 is connected to liquid heat transfer medium side of the medium heat exchanger 25 and the other end is connected to the liquid heat transfer medium side of the indoor air heat exchangers 52a, 52b, and 52c. Note that the heat source side medium decompressor 33 is not limited to an electric expansion valve, but may be another expansion valve, a capillary tube, or an expander, for example.

Further, the medium circuit 30 has utilization side medium decompressors 51a, 51b, and 51c corresponding to the indoor air heat exchangers 52a, 52b, and 52c, respectively. The utilization side medium decompressors 51a, 51b, and 51c are devices for decompressing the heat transfer medium. The utilization side medium decompressors 51a, 51b, and 51c are electric expansion valves, for example. The utilization side medium decompressors 51a, 51b, and 51c decompresses the heat transfer medium that has radiated heat in the medium heat exchanger 25 in a state where the first medium flow path switching device 32 is switched to the first medium radiation state, and decompresses the heat transfer medium transported from the indoor air heat exchangers 52a, 52b, and 52c in a state where the first medium flow path switching device 32 is switched to the first medium evaporation state. One end of the utilization side medium decompressors 51a, 51b, and 51c is connected to the liquid heat transfer medium side of the medium heat exchangers 25 via the heat source side medium decompressor 33, and the other end is connected to the liquid heat transfer medium side of the indoor air heat exchangers 52a, 52b, and 52c.

The indoor air heat exchangers 52a, 52b, and 52c are devices for exchanging heat between the heat transfer medium and the indoor air. The indoor air heat exchangers 52a, 52b, and 52c are, for example, fin-and-tube heat exchangers. The indoor air heat exchangers 52a, 52b, and 52c function as radiators of the heat transfer medium using room air as a cooling source in a state where the first medium flow path switching device 32 is switched to the first medium radiation state; and function as evaporators of the heat transfer medium using indoor air as a heating source in a state where the first medium flow path switching device 32 is switched to the first medium evaporation state. The respective gas heat transfer medium side of the indoor air heat exchangers 52a, 52b, and 52c are connected to the first medium flow path switching device 32, and the respective liquid heat transfer medium side is connected to the liquid heat transfer medium side of the medium heat exchanger 25 via the medium decompressors 51a, 51b, 51c, and 33.

The constituent devices of the aforementioned refrigerant circuit 10 and the medium circuit 30 are located in a heat transfer unit 2 and a plurality of utilization units 5a, 5b, and 5c (in this case, three). The utilization units 5a, 5b and 5c are provided corresponding to the indoor air heat exchangers 52a, 52b, and 52c, respectively.

The heat transfer unit 2 is disposed outdoors. The refrigerant circuit 10 including the medium heat exchanger 25, and the medium booster 31 and the first medium flow path switching device 32 of the medium circuit 30 are provided in the heat transfer unit 2. The heat source side medium decompressor 33 of the medium circuit 30 is also provided in the heat transfer unit 2. In addition, an outdoor fan 26 for supplying outdoor air to the outdoor air heat exchanger 23 is provided in the heat transfer unit 2. The outdoor fan 26 is a fan that drives a blowing component such as a propeller fan using an outdoor fan driving mechanism 26a which is a motor.

The utilization units 5a, 5b, and 5c are disposed indoors. The indoor air heat exchangers 52a, 52b, and 52c of the medium circuit 30 are provided in the utilization units 5a, 5b, and 5c. The utilization side medium decompressors 51a, 51b, and 51c of the medium circuit 30 are also provided in the utilization units 5a, 5b, and 5c. In addition, indoor fans 53a, 53b, and 53c for supplying indoor air to the indoor air heat exchangers 52a, 52b, and 52c are provided in the utilization units 5a, 5b, and 5c. The indoor fans 53a, 53b, and 53c are fans that drive blowing components such as a centrifugal fan or a multi-blade fan using indoor fan driving mechanisms 54a, 54b, and 54c which are motors.

The heat transfer unit 2 and the utilization units 5a, 5b, and 5c are connected to each other by medium communication pipes 6 and 7 constituting a part of the medium circuit 30. The liquid medium communication pipe 6 is a pipe connecting the liquid heat transfer medium side of the medium heat exchanger 25 to one end of the utilization side medium decompressors 51a, 51b, and 51c. The gas medium communication pipe 7 is a pipe connecting the first medium flow path switching device 32 to the gas heat transfer medium side of the indoor air heat exchangers 52a, 52b, and 52c.

The constituent devices of the heat transfer unit 2 and the utilization units 5a, 5b, and 5c are configured to be controlled by a control unit 19. The control unit 19 is configured by communicatively connecting between control boards (not shown) or the like provided in the heat transfer unit 2 and the utilization units 5a, 5b, and 5c. Note that in FIG. 1, for the sake of convenience, the control unit 19 is shown at a position away from the heat transfer unit 2 and the utilization units 5a, 5b, 5c, etc. The control unit 19 controls the constituent devices 21, 22, 24, 26, 31, 32, 33, 51a, 51b, 51c, 53a, 53b, and 53c of the heat transport system 1 (in this case, the heat transfer unit 2 and the utilization units 5a, 5b, and 5c); that is, to control the entire operation of the heat transport system 1.

As described above, the heat transport system 1 includes the heat transfer unit 2, the plurality (in this case, three) of utilization units 5a, 5b, and 5c connected in parallel to each other, the medium communication pipes 6 and 7 that connect the heat transfer unit 2 to the utilization units 5a, 5b, and 5c, and the control unit 19 that controls the constituent devices of the heat transfer unit 2 and the utilization units 5a, 5b, and 5c.

Operation and Characteristics

Figure 2:
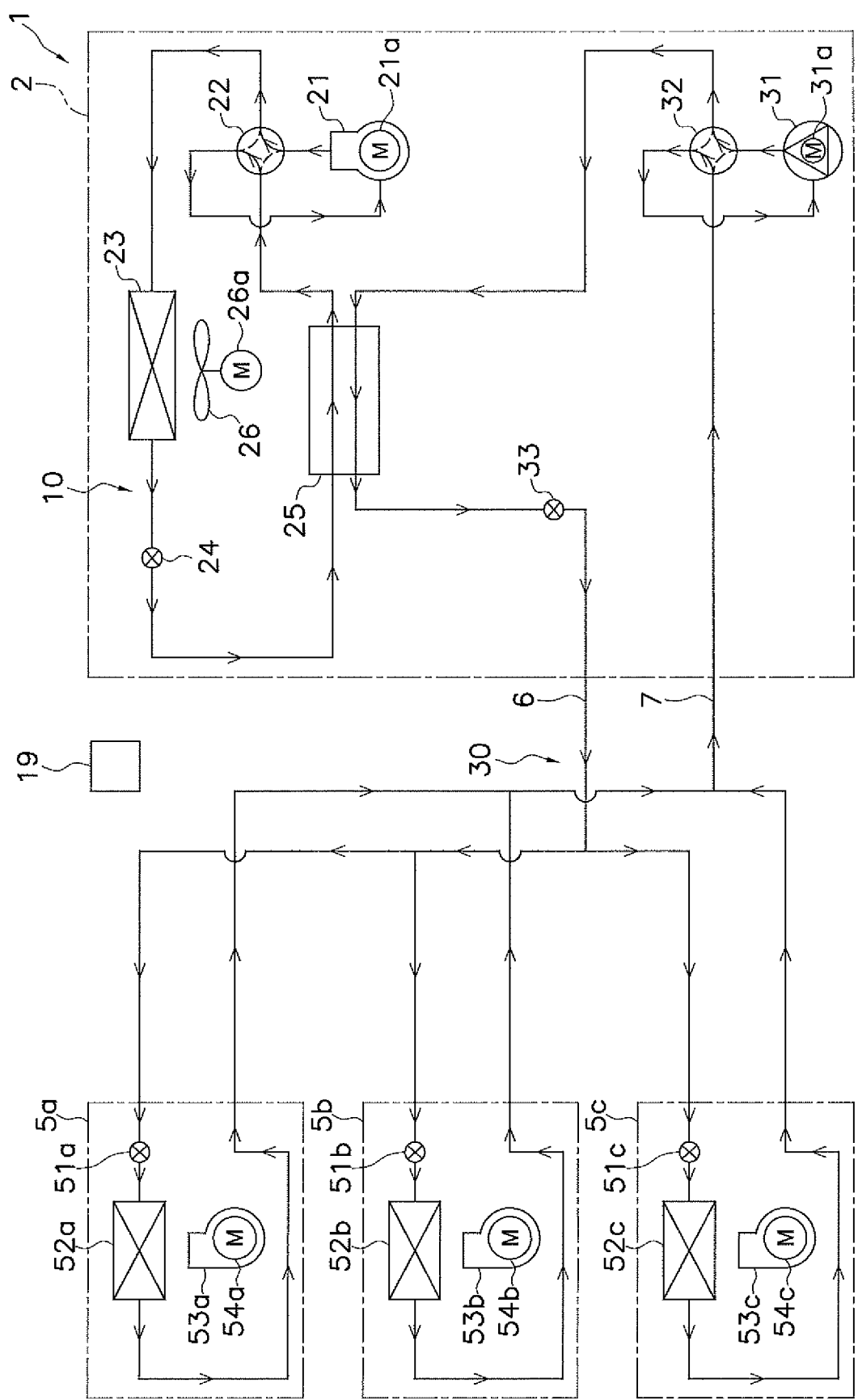
FIG. 2 is a diagram illustrating an action (a flow of the refrigerant and the heat transfer medium) in a cooling operation of the heat transport system according to one or more embodiments of the present invention.
Figure 3:
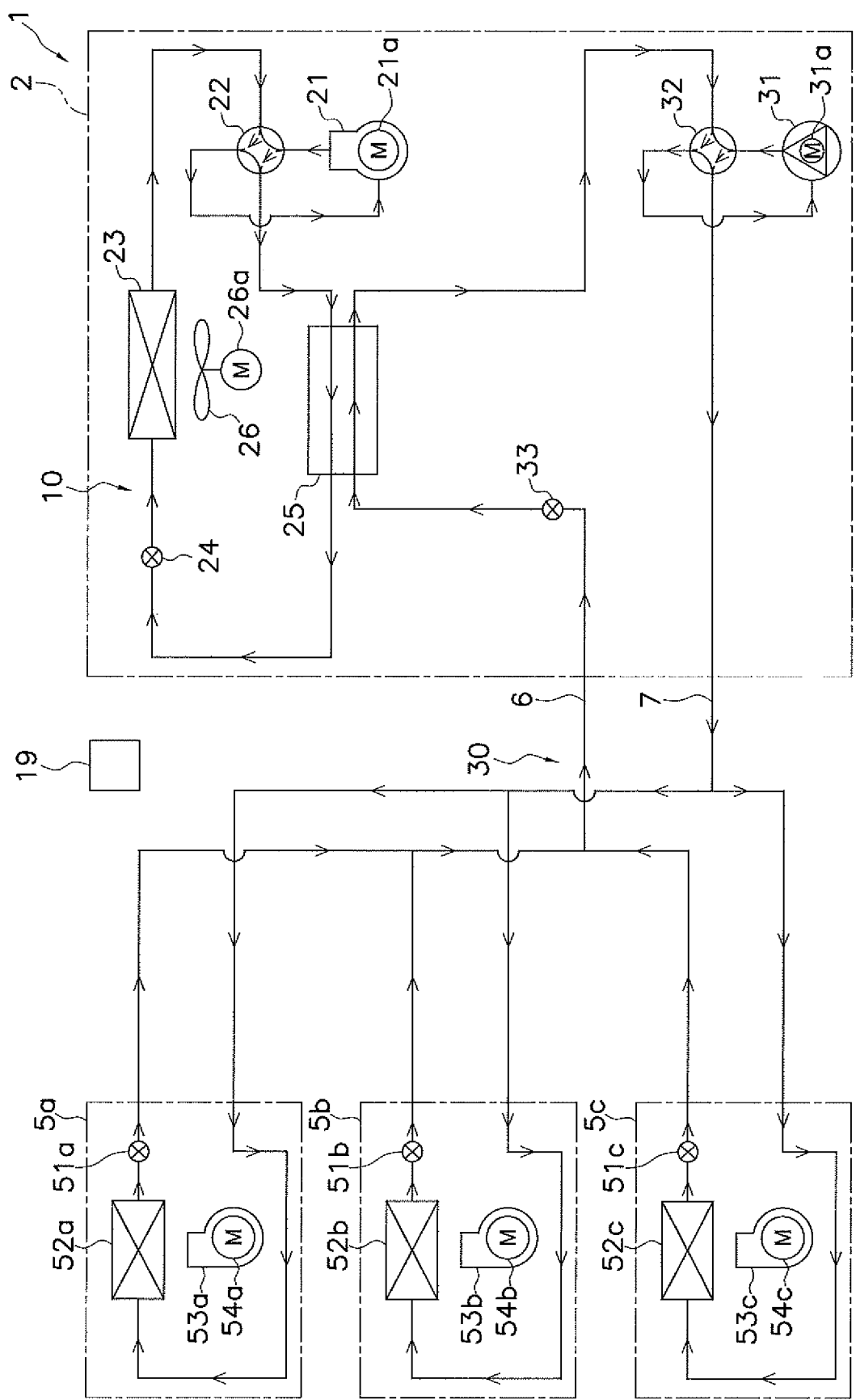
FIG. 3 is a diagram illustrating an action (a flow of the refrigerant and the heat transfer medium) in a heating operation of the heat transport system according to one or more embodiments of the present invention.

Next, the operation and characteristics of the heat transport system 1 will be described with reference to FIGS. 1 to 3. Herein, FIG. 2 is a diagram illustrating an action (a flow of the refrigerant and the heat transfer medium) in a cooling operation of the heat transport system 1 according to one or more embodiments of the present invention, and FIG. 3 is a diagram illustrating an action in a heating operation thereof. In order to perform air conditioning of a room, the heat transport system 1 is capable of performing a cooling operation for cooling the indoor air and a heating operation for heating the indoor air. Note that the cooling operation and the heating operation are performed by the control unit 19.

Cooling Operation

During the cooling operation, for example, when all of the utilization units 5a, 5b, and 5c perform the cooling operation (that is, the operation in which all of the indoor air heat exchangers 52a, 52b, and 52c function as evaporators of the heat transfer medium to cool the indoor air), the refrigerant flow path switching device 22 is switched to the refrigerant radiation state (refer to the solid line of the refrigerant flow path switching device 22 in FIG. 2) and the first medium flow path switching device 32 is switched to the first medium radiation state (refer to the solid line of the first medium flow path switching device 32 in FIG. 2).

The refrigerant discharged from the refrigerant booster 21 is then sent to the outdoor air heat exchanger 23 through the refrigerant flow path switching device 22. The refrigerant sent to the outdoor air heat exchanger 23 is cooled by exchanging heat with the outdoor air supplied by the outdoor fan 26 in the outdoor air heat exchanger 23 functioning as a radiator of the refrigerant, and thereby is condensed. Thereafter, the refrigerant that has radiated heat in the outdoor air heat exchanger 23 is decompressed by the refrigerant decompressor 24 and sent to the medium heat exchanger 25. The refrigerant sent to the medium heat exchanger 25 is heated by exchanging heat with the heat transfer medium in the medium heat exchanger 25 functioning as an evaporator of the refrigerant, and thereby is evaporated. The refrigerant evaporated in the medium heat exchanger 25 is sucked into the refrigerant booster 21 through the refrigerant flow path switching device 22 and discharged again from the refrigerant booster 21.

On the other hand, the heat transfer medium discharged from the medium booster 31 is sent to the medium heat exchanger 25 through the first medium flow path switching device 32. The heat transfer medium sent to the medium heat exchanger 25 is cooled through heat exchange with the refrigerant in the medium heat exchanger 25 functioning as an evaporator of the heat transfer medium. The heat transfer medium that has radiated heat in the medium heat exchanger 25 is introduced through the heat source side medium decompressor 33 to the liquid medium communication pipe 6 and diverged therefrom. The heat transfer medium diverged from the liquid medium communication pipe 6 is sent to the respective indoor air heat exchangers 52a, 52b, and 52c after being decompressed by the utilization side medium decompressors 51a, 51b, and 51c. In the indoor air heat exchangers 52a, 52b, and 52c functioning as evaporators of the heat transfer medium, the transfer medium sent therein is cooled by exchanging heat with the indoor air supplied by the indoor fans 53a, 53b, and 53c, and thereby evaporated. As a result, a cooling operation for cooling indoor air is performed. The heat transfer medium that has evaporated in the indoor air heat exchangers 52a, 52b, and 52c is sent to the gas medium communication pipe 7 and merged therein. The heat transfer medium that has merged in the gas medium communication pipe 7 is sucked into the medium booster 31 through the first medium flow path switching device 32 and discharged again from the medium booster 31.

Heating Operation

During a heating operation, for example, when all of the utilization units 5a, 5b, and 5c perform the heating operation (that is, the operation in which all of the indoor air heat exchangers 52a, 52b, and 52c function as radiators of the heat transfer medium to heat the indoor air), the refrigerant flow path switching device 22 is switched to the refrigerant evaporation state (refer to the broken line of the refrigerant flow path switching device 22 in FIG. 3) and the first medium flow path switching device 32 is switched to the first medium radiation state (refer to the broken line of the first medium flow path switching device 32 in FIG. 3).

The refrigerant discharged from the refrigerant booster 21 is then sent to the medium heat exchanger 25 through the refrigerant flow path switching device 22. The refrigerant sent to the medium heat exchanger 25 is cooled by exchanging heat with the heat transfer medium in the medium heat exchanger 25 functioning as a radiator of the refrigerant, and thereby condensed. The refrigerant that has radiated heat in the medium heat exchanger 25 is decompressed by the refrigerant decompressor 24 and thereafter sent to the outdoor air heat exchanger 23. The refrigerant sent to the outdoor air heat exchanger 23 is heated by exchanging heat with the outdoor air supplied by the outdoor fan 26 in the outdoor air heat exchanger 23 functioning as an evaporator of the refrigerant, and thereby evaporated. The refrigerant that has evaporated in the outdoor air heat exchanger 23 is sucked into the refrigerant booster 21 through the refrigerant flow path switching device 22 and discharged again from the refrigerant booster 21.

On the other hand, the heat transfer medium discharged from the medium booster 31 is introduced through the first medium flow path switching device 32 to the gas medium communication pipe 7 and diverged therefrom. The heat transfer medium diverged from the gas medium communication pipe 7 is sent to the indoor air heat exchangers 52a, 52b, and 52c. In the indoor air heat exchangers 52a, 52b, and 52c functioning as radiators of the heat transfer medium, the heat transfer medium sent to the indoor air heat exchangers 52a, 52b, and 52c is cooled by exchanging heat with the indoor air supplied by the indoor fans 53a, 53b, and 53c. As a result, the heating operation for heating the indoor air is performed. After being decompressed by the utilization side medium decompressors 51a, 51b, and 51c, the heat transfer medium that has radiated heat in the indoor air heat exchangers 52a, 52b, and 52c is sent to the liquid medium communication pipe 6 and merged therein. The heat transfer medium merged in the liquid medium communication pipe 6 is further decompressed by the heat source side medium decompressor 33; thereafter sent to the medium heat exchanger 25. The heat transfer medium sent to the medium heat exchanger 25 is heated by exchanging heat with the refrigerant in the medium heat exchanger 25 functioning as an evaporator of the heat transfer medium, and thereby evaporated. The heat transfer medium that has evaporated in the medium heat exchanger 25 is sucked into the medium booster 31 through the first medium flow path switching device 32 and discharged again from the medium booster 31.

Characteristics

Here, with this configuration, the refrigerant in the refrigerant circuit 10 can be circulated while the refrigerant flow path switching device 22 is switched to the refrigerant radiation state; and the heat transfer medium in the medium circuit 30 can be circulated while the first medium flow path switching device 32 is switched to the first medium radiation state (refer to FIG. 2). In this case, in the medium heat exchanger 25, the heat transfer medium radiates heat due to the evaporation of the refrigerant, and therefore cold heat is transferred from the refrigerant circuit 10 to the medium circuit 30. Further, the refrigerant flow path switching device 22 is switched to the refrigerant evaporation state, allowing the refrigerant in the refrigerant circuit 10 to circulate; and the first medium flow path switching device 32 is switched to the first medium evaporation state, allowing the heat transfer medium in the medium circuit 30 to circulate (refer to FIG. 3). In this case, in the medium the exchanger 25, the heat transfer medium evaporates due to the radiation of the refrigerant, and therefore hot heat is transferred from the refrigerant circuit 10 to the medium circuit 30. This configuration allows the operation of transferring the cold heat from the refrigerant circuit 10 to the medium circuit 30 and the operation of transferring hot heat from the refrigerant circuit 10 to the medium circuit 30 to be switched and performed by the refrigerant flow path switching device 22 provided in the refrigerant circuit 10 and by the first medium flow path switching device 32 provided in the medium circuit 30. The cold or hot heat transferred from the refrigerant circuit 10 to the medium circuit 30 by the above operation is further transferred to the room air by heat exchange between the heat transfer medium and the indoor air in the indoor air heat exchangers 52a, 52b, and 52c; thus, indoor air conditioning (cooling and heating) can be performed.

Particularly, here, when circulating the heat transfer medium in the medium circuit 30 in a state where the first medium flow path switching device 32 is switched to the first medium radiation state, all the indoor air heat exchangers 52a, 52b, and 52c function as evaporators of the heat transfer medium. For this reason, in the indoor air heat exchangers 52a, 52b, and 52c, indoor air can be cooled through heat exchange between the heat transfer medium and indoor air, thereby cooling the room (refer to FIG. 2). In addition, when circulating the heat transfer medium in the medium circuit 30 in a state where the first medium flow path switching device 32 is switched to the first medium evaporation state, all the indoor air heat exchangers 52a, 52b, and 52c function as radiators of the heat transfer medium. For this reason, in the indoor air heat exchangers 52a, 52b, and 52c, indoor air can be heated through heat exchange between the heat transfer medium and indoor air, thereby heating the room (refer to FIG. 3). As described above, here, the refrigerant flow path switching device 22 provided in the refrigerant circuit 10 and the first medium flow path switching device 32 provided in the medium circuit 30 enables all the indoor air heat exchangers 52a, 52b, and 52c to be collectively switched to thereby perform the operation of cooling and heating a room.

Furthermore, in performing the above operation, since carbon dioxide is used as the heat transfer medium here, the pipe diameter (pipe for connecting between the components constituting the medium circuit 30) of the pipe constituting the medium circuit 30 can be reduced as compared with the case where water is used as the heat transfer medium. With this configuration, when installing the pipe (particularly the medium communication pipes 6 and 7) constituting the medium circuit 30 to the indoor side (in this case, the indoor air heat exchangers 52a, 52b, and 52c), it is possible to reduce the installation space and the labor of piping construction and maintenance thereof. In addition, the amount of heat transfer medium sealed in the medium circuit 30 can also be reduced.

Although a fluid containing HFC-32 and/or HFO refrigerant is used as the refrigerant here, the risk of the refrigerant leaking into the room can be eliminated even if the refrigerant leaks from the refrigerant circuit 10 since it is not necessary to install the pipe constituting the refrigerant circuit 10 to the interior of the room. Moreover, although the pipe constituting the medium circuit 30 is installed to the interior of the room as described above, even if the heat transfer medium leaks from the medium circuit 30, only incombustible carbon dioxide leaks into the room and therefore the possibility of causing an ignition accident can be decreased.

Furthermore, here, both HFC-32 and/or HFO refrigerant used as the refrigerant and carbon dioxide used as the heat transfer medium have an ozone layer destruction coefficient of zero and are liquids with a low global warming potential; thus, capable of satisfying the requirement of reducing the environmental load.

Given these factors, the heat transport system 1 includes the refrigerant circuit 10 through which the refrigerant circulates and the medium circuit 30 through which the heat transfer medium circulates, and performs heat exchange of the heat transfer medium with the indoor air to perform air conditioning of a room. Thereby it is possible to reduce the pipe diameter of the pipe constituting the medium circuit 30 and to reduce the environmental load and improve safety as well.

Furthermore, the refrigerant circuit 10 is located in the heat transfer unit 2 disposed outdoors and therefore the risk of the refrigerant leaking into the room can be reliably eliminated even if the refrigerant leaks from the refrigerant circuit 10. Regarding the medium circuit 30, although the indoor air heat exchanger 52a, 52b, and 52c are located in the utilization units 5a, 5b, and 5c disposed in the room, the medium booster 31 and the first medium flow path switching device 32 are provided in the heat transfer unit 2. This allows many of the devices constituting the heat transport system 1 to be collectively arranged outdoors, thus minimizing the number of devices disposed in the room and achieving compactness of the utilization units 5a, 5b, and 5c.

In the above-described embodiments, since carbon dioxide is used as the heat transfer medium, the pipe diameter of the pipe constituting the medium circuit 30 can be reduced as compared with the case where water is used as the heat transfer medium.

Hence, according to one or more embodiments, to make full use of this situation, the pipe diameter of the pipe constituting the medium circuit 30 is set to $\frac{3}{8}$ inch or less when the rated capacity of the heat transport system 1 is 5 horsepower or less. That is, the pipe used for the medium circuit 30 is limited to those having a pipe diameter of $\frac{3}{8}$ inch or less for the heat transport system 1 whose rated capacity is up to 5 horsepower. Note that "rated capacity" means a value equivalent to "nominal capacity" described in the product catalog or instruction manual.

As described above, according to one or more embodiments, limiting the pipe diameter of the pipe constituting the medium circuit 30 to $\frac{3}{8}$ inch or less makes it possible to perform piping construction within a narrow space, and the amount of the heat transfer medium sealed in the medium circuit 30 can be further reduced.

In one or more embodiments of the present invention, the refrigerant circuit 10 including the medium heat exchanger 25, and the medium booster 31 and the first medium flow path switching device 32 in the medium circuit 30 are provided in the heat transfer unit 2; however, the present invention is not limited thereto.

Figure 4:
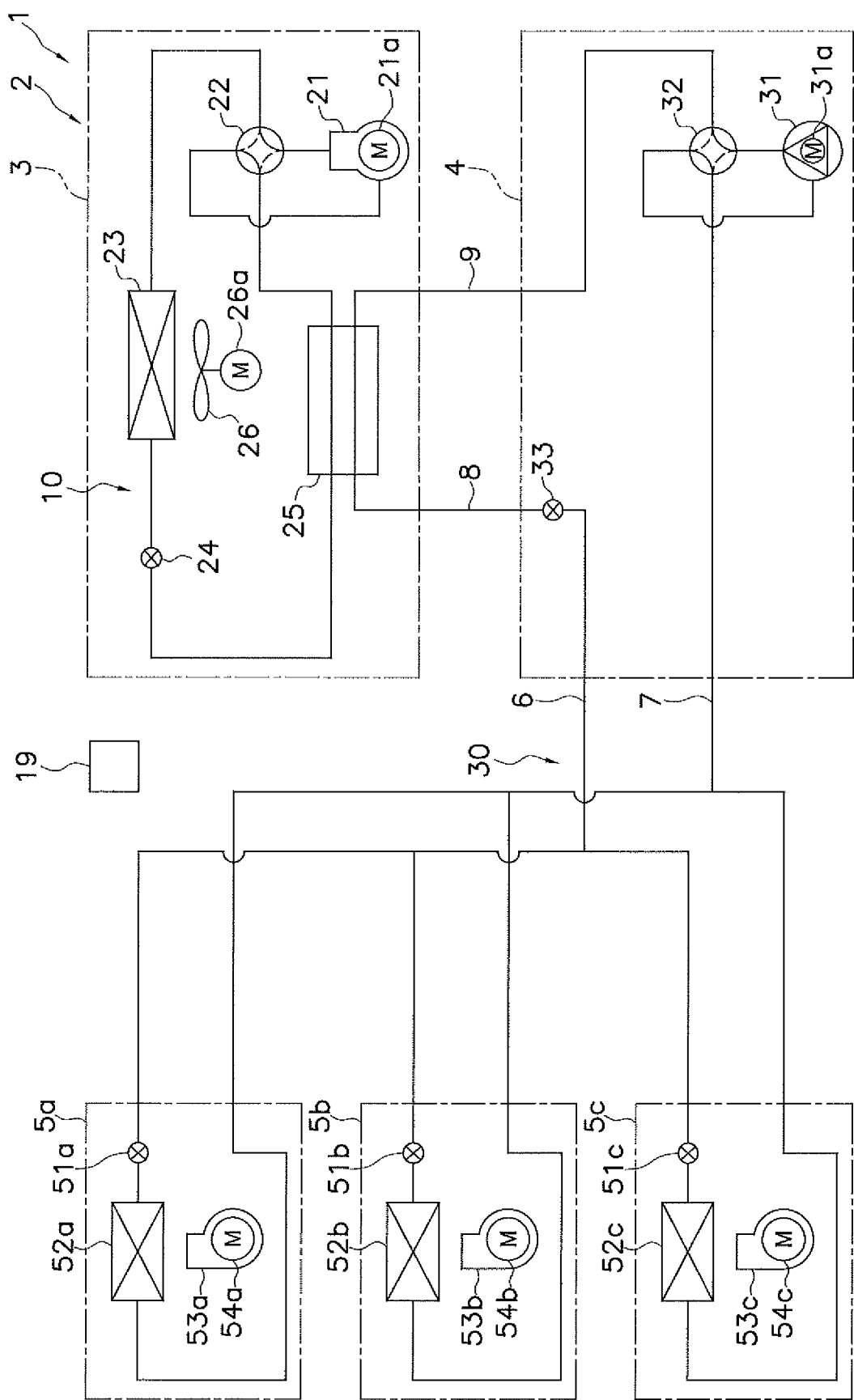
FIG. 4 is a schematic configuration diagram of a heat transport system according to one or more embodiments of the present invention.

For example, as shown in FIG. 4, the heat transfer unit 2 may include an air cooling unit 3 provided with the refrigerant circuit 10, and a heat source unit 4 provided with the medium booster 31 and the first medium flow path switching device 32. In other words, according to one or more embodiments, the heat transfer unit 2 adopts a configuration in which the air cooling unit 3 and the heat source unit 4 are separated, and the air cooling unit 3 and the heat source unit 4 are connected to each other via medium communication pipes 8 and 9. Therefore, according to one or more embodiments, the refrigerant circuit 10 of the heat transport system 1 is constituted by the air cooling unit 3 included in the heat transfer unit 2, and the medium circuit 30 of the heat transport system 1 has a configuration in which the air cooling unit 3 is connected to the heat source unit 4 included in the heat transfer unit 2 via the medium communication pipes 8 and 9 and also the heat source unit 4 is connected to the utilization units 5a, 5b and 5c via the medium communication pipes 6 and 7.

With this configuration, according to one or more embodiments, the refrigerant circuit 10 is provided in the air cooling unit 3, a part of the medium circuit 30 included in the heat transfer unit 2 except for the medium heat exchanger 25 is provided in the heat source unit 4, and the air cooling unit 3 and the heat source unit 4 are connected to each other via a pipe (here, the medium communication pipes 8 and 9) through which the heat transfer medium flows, allowing the heat transfer unit 2 to be easily configured.

In the above-described embodiments, the medium circuit 30 includes the plurality of indoor air heat exchangers 52a, 52b, and 52c. Therefore, the flow rate of the heat transfer medium circulating the medium circuit 30 may be controlled in accordance with variations in the number of the heat exchangers 52a, 52b, and 52c that perform heat exchange between the heat transfer medium and the indoor air, or the like.

According to one or more embodiments therefore, if the medium booster driving mechanism 31a constituting the medium booster 31 is a motor, then a motor whose rotation speed is controlled by the inverter is included in the medium booster 31 as the medium booster driving mechanism 31.

According to one or more embodiments, this configuration allows the flow rate of the heat transfer medium circulating the medium 30 to be controlled in accordance with the variation in the number of the indoor air heat exchangers 52a, 52b, and 52c that perform heat exchange between the heat transfer medium and the indoor air, or the like.

In the above-described embodiments, the reliability of the medium circuit 30 may be enhanced because instead of water, carbon dioxide is used as the heat transfer medium.

Thus, a rotary compressor is used as the medium booster 31 according to one or more embodiments. Here, the rotary compressor is a device with a proven experience in a heat pump water heater or the like using carbon dioxide. For example, a rotary compressor as shown in FIGS. 5 and 6 can be used as the medium booster 31.

Figure 5:
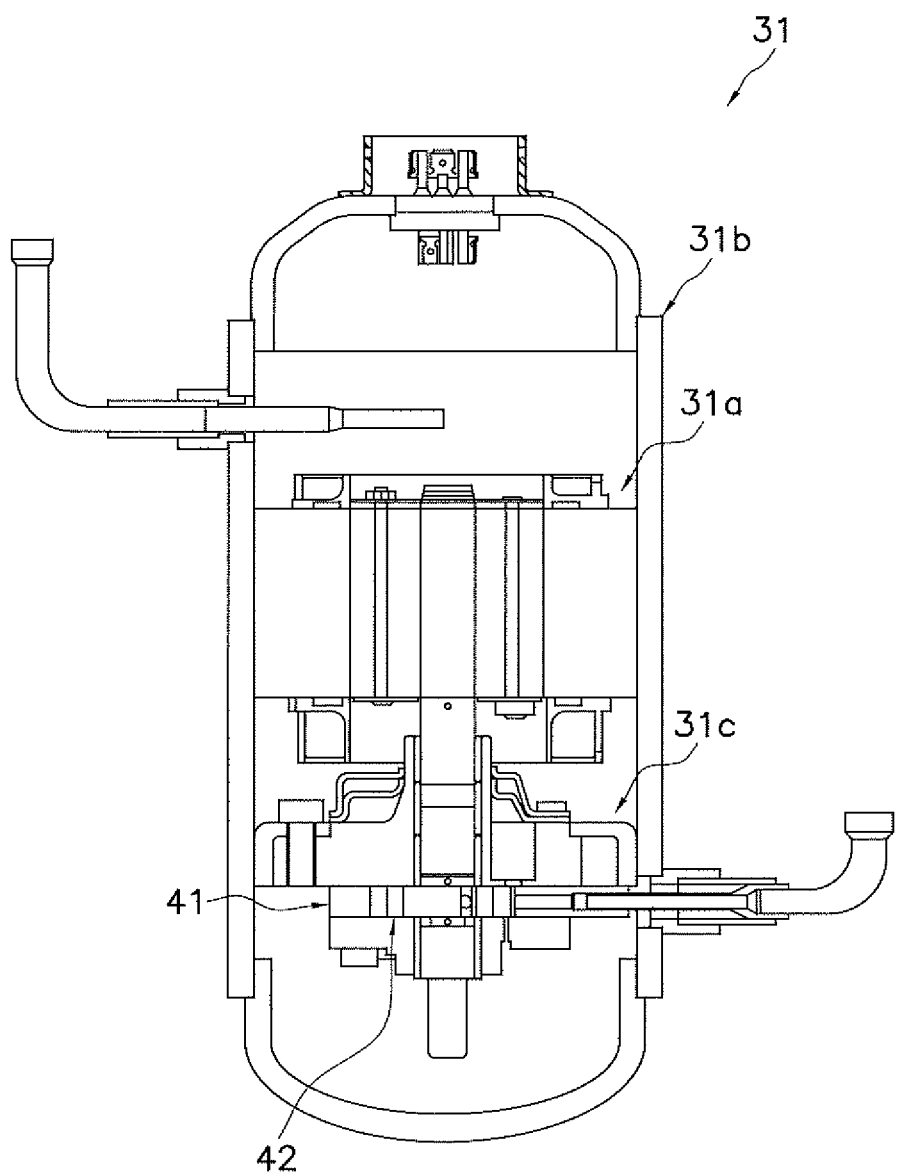
FIG. 5 is a schematic longitudinal sectional view of a rotary compressor used as a medium booster constituting a heat transport system according to one or more embodiments of the present invention.
Figure 6:
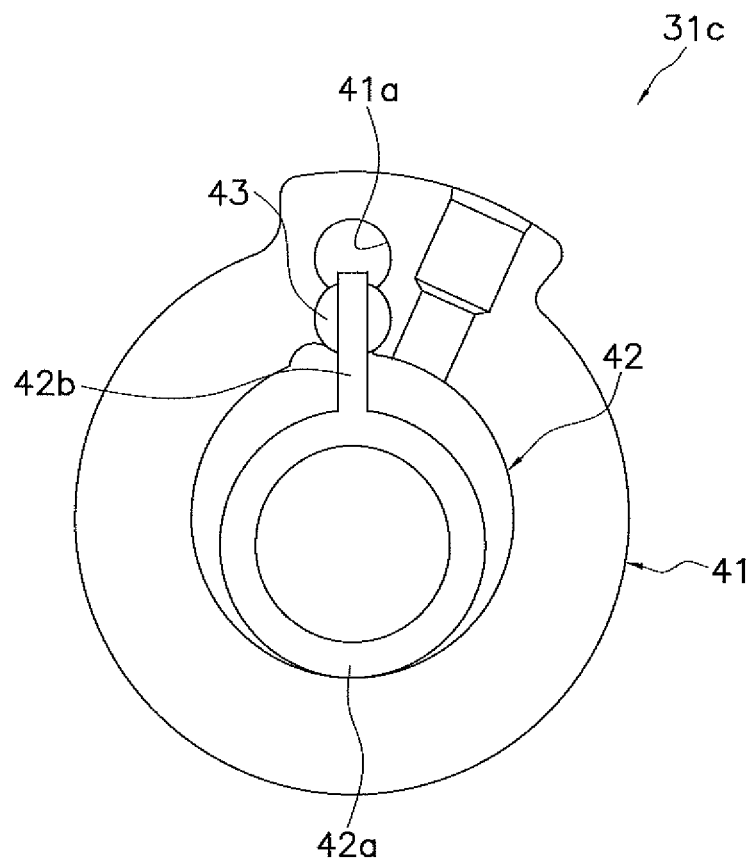
FIG. 6 is a schematic plan sectional view of a medium compression component constituting the rotary compressor as the medium booster of FIG. 5.

The medium booster 31 shown in FIGS. 5 and 6 which is a rotary compressor mainly includes a casing 31b, a medium compression component 31c, and a medium booster driving mechanism 31a which is a motor. The medium booster driving mechanism 31a and the medium compression component 31c are accommodated in the casing 31b. In FIG. 5, the medium booster driving mechanism 31a is disposed above the medium compression component 31c. The medium compression component 31c mainly includes a cylinder 41 and a swing 42 swinging within the cylinder 41. A bush hole 41a is formed in the cylinder 41. The swing 42 is configured by integrally forming a cylindrical rotor portion 42a and a rectangular parallelepiped blade portion 42b. In the bush hole 41a, a pair of substantially semi-cylindrical columnar bushes 43 are arranged to be swingable. A blade portion 42b of the swing 42 is inserted between the bushes 43, and the blade portion 42b is supported by both bushes 43 to freely advance and retract. Then, when the medium booster driving mechanism 31a (motor) is driven, the swing 42 swings around both bushes 43 serving as a swing center to thereby compress the heat transfer medium between the rotor portion 42a and the cylinder 41. Note that the rotary compressor used as the medium booster 31 is not limited to the one in which the rotor portion 42a and the blade portion 42b are integrally formed as described above, but the rotor portion 42a and the blade portion 42b may be formed separately.

As described above, according to one or more embodiments, a rotary compressor that has proven experience in a heat pump water heater or the like using carbon dioxide is used as the medium booster 31, and thus a highly reliable medium circuit 30 can be configured.

In one or more embodiments, lubricating oil is sealed in the medium circuit 30 together with the heat transfer medium in order to lubricate the medium compression component, etc. of the medium booster 31. In this case, it is necessary to perform vacuuming when constructing the medium circuit 30, and the lubricating oil accumulating in the medium circuit 30 must be taken into consideration also when arranging the pipe constituting the medium circuit 30.

Figure 7:
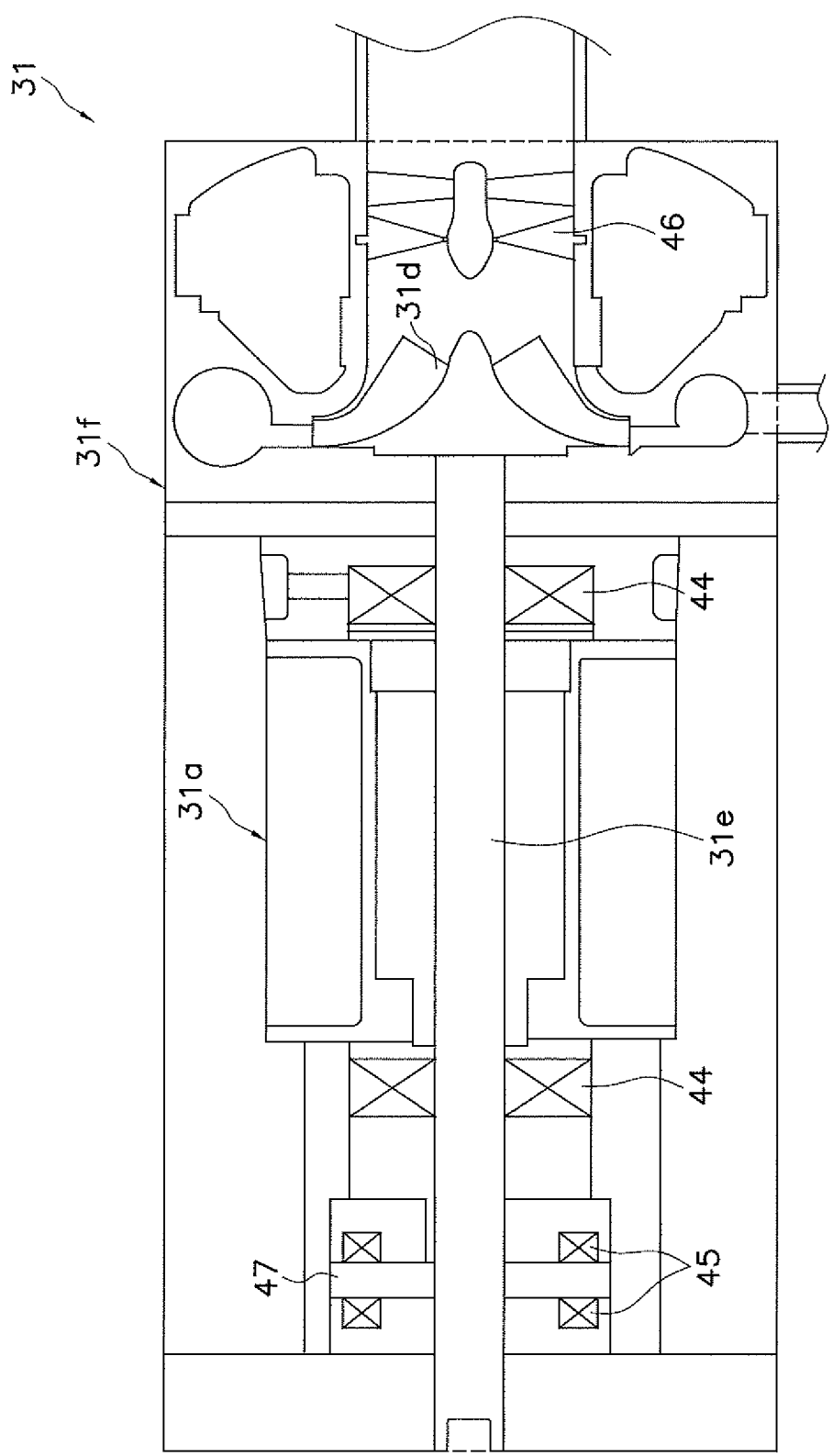
FIG. 7 is a schematic sectional view of a turbo compressor used as a medium booster constituting a heat transport system according to one or more embodiments of the present invention.

Hence, according to one or more embodiments, an oil-less turbo compressor is adopted as the medium booster 31. As shown in FIG. 7, a turbo compressor having a medium compression component made of an impeller and a medium booster driving mechanism including a motor connected to a rotating shaft of the medium compression component, wherein the rotating shaft is supported by a magnetic bearing, can be used as the medium booster 31, for example.

The medium booster 31 which is the turbo compressor shown in FIG. 7 mainly includes a casing 31f, a medium compression component 31d which is an impeller, a medium booster driving mechanism 31a which is a motor connected to a rotating shaft 31e of the medium compression component 31d, a radial magnetic bearing 44, a thrust magnetic bearing 45, and a guide vane 46. The medium compression component 31d, the rotating shaft 31e, the medium booster driving mechanism 31a, the radial magnetic bearing 44, the thrust magnetic bearing 45, and the guide vane 46 are housed in the casing 31f. In FIG. 7, the medium compression component 31d is disposed on the left side of the guide vane 46, and the rotating shaft 31e extends toward the left side of the medium compression component 31d. The medium booster driving mechanism 31a is disposed near the center in the crosswise direction of the rotating shaft 31e, radial magnetic bearings 44 are disposed on the left and right sides of the medium booster driving mechanism 31a, and thrust magnetic bearings 45 are disposed near the left end of the rotating shaft 31e. The medium compression component 31d has a blade inclined rearward with respect to the rotation direction. The guide vane 46 is a blade member for controlling the flow rate of the heat transfer medium sucked into the medium compression component 31d. The radial magnetic bearings 44 have electromagnets arranged so as to oppose each other across the rotating shaft 31e in the radial direction and are bearings that rotatably support the rotating shaft 31e in a non-contact manner. The thrust magnetic bearings 45 have electromagnets arranged so as to oppose each other across a thrust disk 47 provided on the rotating shaft 31e in the axial direction, and are bearings that support the rotating shaft 31e in a non-contact manner at a predetermined axial position. Then, when the medium booster driving mechanism 31a (motor) is driven, the heat transfer medium is compressed by the rotation of the medium compression component 31d (impeller). Note that according to one or more embodiments, the turbo compressor is not limited to a single-stage turbo compressor having a single medium compression component 31d (impeller), but may be a multi-stage turbo compressor having a plurality of medium compression components 31d. In addition, the oil-less turbo compressor is not limited to have the configuration in which the rotating shaft 31e is supported by the magnetic bearings 45 and 46, but may have a configuration in which the rotating shaft 31e is supported by a gas bearing (not shown).

As described above, the oil-less turbo compressor configured to support the rotating shaft 31e by the magnetic bearings 45, 46 and the gas bearing (not shown) is used as the medium booster 31 according to one or more embodiments, and thus capable of achieving an oil-less medium circuit 30. This configuration requires no vacuuming operation when constructing the medium circuit 30. Moreover, because it is not necessary to take into consideration the accumulation of the lubricating oil in the medium circuit 30, the pipe constituting the medium circuit 30 can be freely arranged.

In one or more embodiments, the heat source side medium decompressor 33 is provided on the liquid heat transfer medium side of the medium heat exchanger 25 in the medium circuit 30; the heat transfer medium is decompressed by the heat source side medium decompressor 33 in a state where the first medium flow path switching device 32 is switched to the first medium evaporation state; and in a state where the first medium flow path switching device 32 is switched to the first medium radiation state, the heat source side medium decompressor 33 is brought into a fully opened state so as not to reduce the pressure of the heat transfer medium as much as possible. However, the heat transfer medium is slightly depressurized even if the heat source side medium decompressor 33 is in the fully opened state. Therefore, the amount of pressure reduction may be further reduced.

Figure 8:
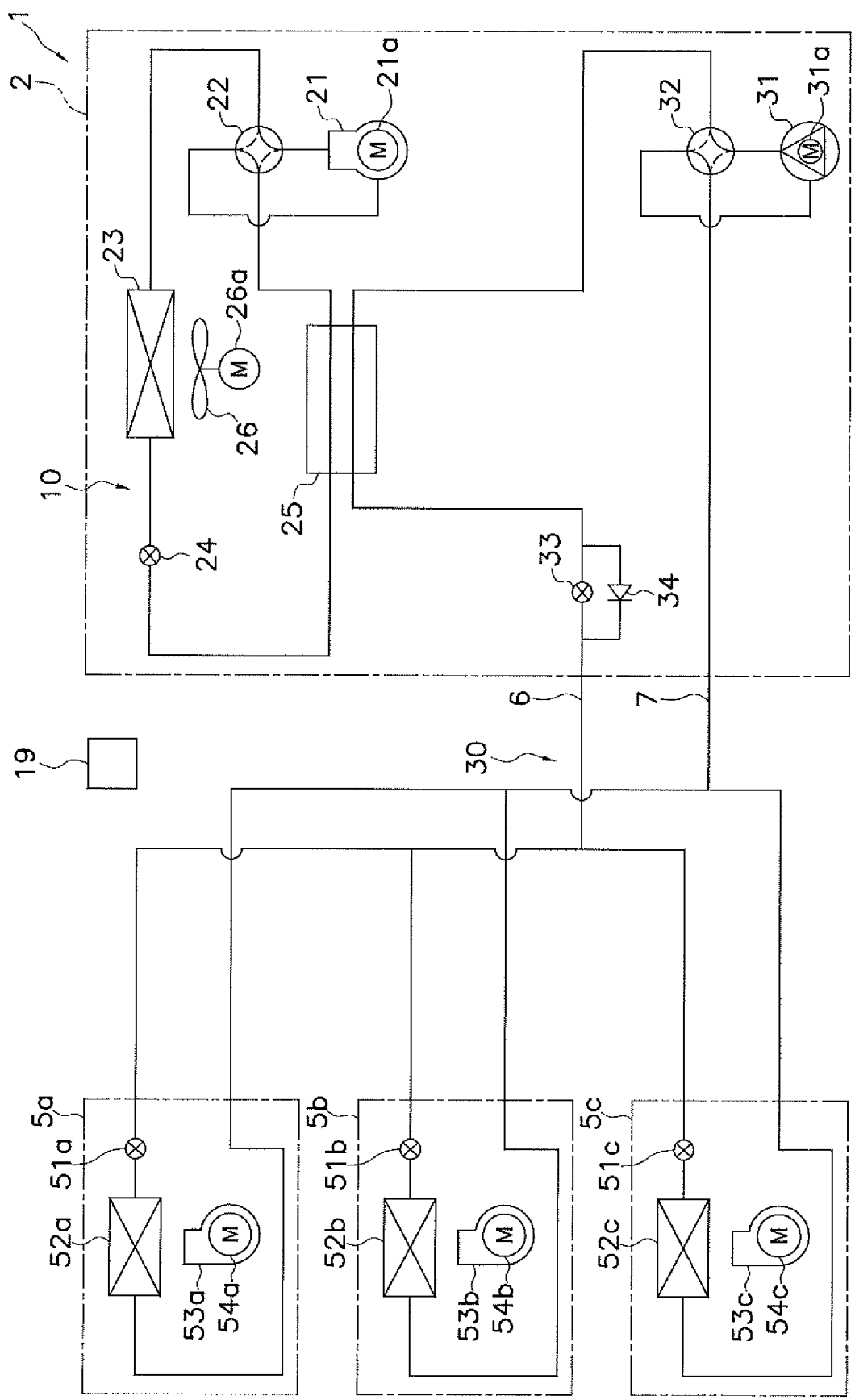
FIG. 8 is a schematic configuration diagram of a heat transport system according to one or more embodiments of the present invention.

In view of this, according to one or more embodiments, the medium circuit 30 is provided with a check valve 34 that permits only the flow of the heat transfer medium from the liquid heat transfer medium side of the medium heat exchanger 25 to the liquid medium communication pipe 6 side as shown in FIG. 8. The check valve 34 is provided so as to bypass the heat source side medium decompressor 33. It is to be noted that in FIG. 8, the check valve 34 is provided in a configuration in which the heat transfer unit 2 is not divided into the air cooling unit 3 and the heat source unit 4; however, the present invention is not limited thereto. For example, although not shown here, in the configuration (refer to FIG. 4) in which the heat transfer unit 2 is divided into the air cooling unit 3 and the heat source unit 4, the check valve 34 may be provided in the heat source device 4 which is provided with the heat source side medium decompressor 33.

Therefore, according to one or more embodiments, since the heat transfer medium can be caused to flow from the liquid heat transfer medium side of the medium heat exchanger 25 to the liquid medium communication pipe 6 side through the check valve 34, in the state where the first medium flow path switching device 32 is switched to the first medium radiation state, the heat transfer medium can flow from the liquid heat transfer medium side of the medium heat exchanger 25 to the liquid medium communication pipe 6 side without being decompressed by the heat source side medium decompressor 33. On the other hand, in the state where the first medium flow path switching device 32 is switched to the first medium evaporation state, the heat transfer medium does not flow from the liquid medium communication pipe 6 side to the liquid heat transfer medium side of the medium heat exchanger 25 through the check valve 34, thereby the heat transfer medium can be decompressed by the heat source side medium decompressor 33.

In one or more embodiments, the operation of transferring cold heat from the refrigerant circuit 10 to the medium circuit 30 and the operation of transferring hot heat from the refrigerant circuit 10 to the medium circuit 30 are switched and performed, and therefore the distribution of the heat transfer medium in the medium circuit 30 will be different between both operations. Thus, a surplus of heat transfer medium is generated in the medium circuit 30 between the two operations. This surplus of heat transfer medium accumulates in the medium heat exchanger 25 and/or the indoor air heat exchangers 52a, 52b, and 52c; hence, possibly lowering the performance of heat exchange.

Figure 9:
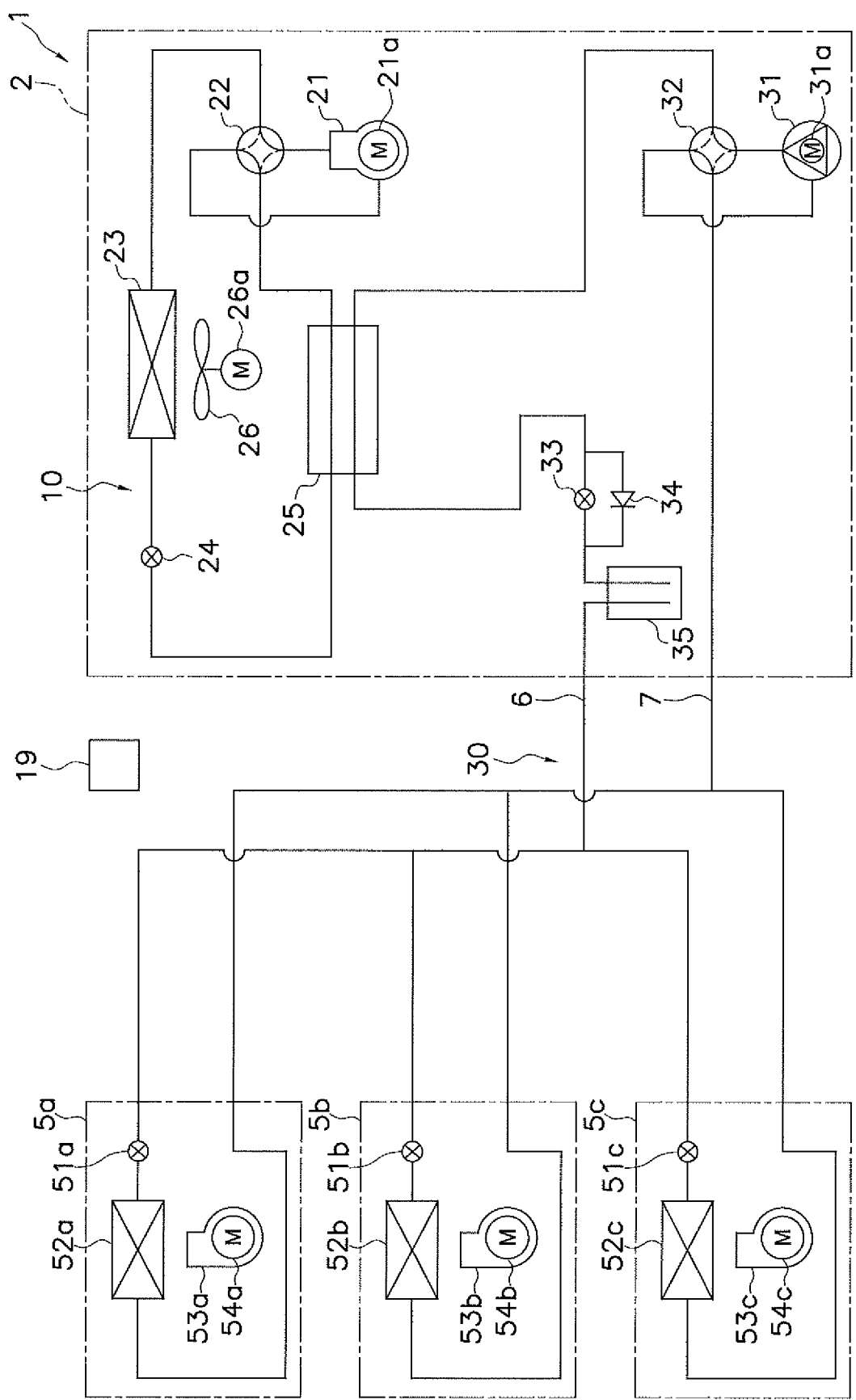
FIG. 9 is a schematic configuration diagram of a heat transport system according to one or more embodiments of the present invention.

Given this situation, according to one or more embodiments, the medium circuit 30 is further provided with a receiver 35 for storing the heat transfer medium circulating through the medium circuit 30, as shown in FIG. 9. The receiver 35 is provided on the liquid heat transfer medium side of the medium heat exchanger 25 and can store the heat transfer medium flowing between the liquid heat transfer medium side of the medium heat exchanger 25 and the liquid medium communication pipe 6. Specifically, in a state where the first medium flow path switching device 32 is switched to the first medium radiation state, the receiver 35 can store the heat transfer medium flowing from the liquid heat transfer medium side of the medium heat exchanger 25 toward the liquid medium communication pipe 6 side, whereas when in a state where the first medium flow path switching device 32 is switched to the first medium evaporation state, the receiver 35 can store the heat transfer medium flowing from the liquid medium communication pipe 6 side toward the liquid heat transfer medium side of the medium heat exchanger 25. In addition, here, the receiver 35 is provided between the heat source side medium decompressor 33 and the liquid medium communication pipe 6. For this reason, in the state where the first medium flow path switching device 32 is switched to the first medium evaporation state, the receiver 35 can store the heat transfer medium flowing from the liquid medium communication pipe 6 side without letting the heat transfer medium decompressed by the heat source side medium decompressor 33. In addition, here, as in the configuration of FIG. 8, the check valve 34 bypassing the heat source side medium decompressor 33 is provided, and therefore in the state where the first medium flow path switching device 32 is switched to the first medium radiation state, the receiver 35 can store the heat transfer medium flowing from the liquid medium communication pipe 6 side without causing the heat transfer medium to be decompressed by the heat source side medium decompressor 33. Note that in the case where it is acceptable for the heat transfer medium to be slightly depressurized by the heat source side medium decompressor 33 when the first medium flow path switching device 32 is switched to the first medium radiation state, it is not necessary to provide the check valve 34 bypassing the heat source side medium decompressor 33, as in the configuration of FIG. 1. Further, in FIG. 9, the receiver 35 is provided in a configuration in which the air cooling unit 3 and the heat source unit 4 are not separately disposed in the heat transfer unit 2; however, the present invention is not limited thereto. For example, although not shown here, in the configuration (refer to FIG. 4) in which the heat transfer unit 2 is constituted by being divided into the air cooling unit 3 and the heat source unit 4, the receiver 35 may be provided in the heat source unit 4.

Thus, according to one or more embodiments, the receiver 35 is provided in the medium circuit 30 so as to store the surplus heat transfer medium. As a result, the surplus heat transfer medium accumulating in the medium heat exchanger 25 and in the indoor air heat exchangers 52a, 52b, and 52c can be reduced, and the deterioration of the heat exchange performance of the medium heat exchanger 25 and the indoor air heat exchangers 52a, 52b, and 52c can be decreased.

In one or more embodiments, in providing the receiver 35 on the liquid heat transfer medium side of the medium heat exchanger 25, as shown in FIG. 9, together with providing the check valve 34 for bypassing the heat source side medium decompressor 33, the receiver 35 is provided between the heat source side medium decompressor 33 and the liquid medium communication pipe 6. This configuration allows the heat transfer medium to be stored in the receiver 35 without being decompressed by the heat source side medium decompressor 33 in both states where the first medium flow path switching device 32 is switched to the first medium radiation state and the state where the first medium flow path switching device 32 is switched to the first medium evaporation state. However, such a configuration is not limited to that shown in FIG. 9.

Figure 10:
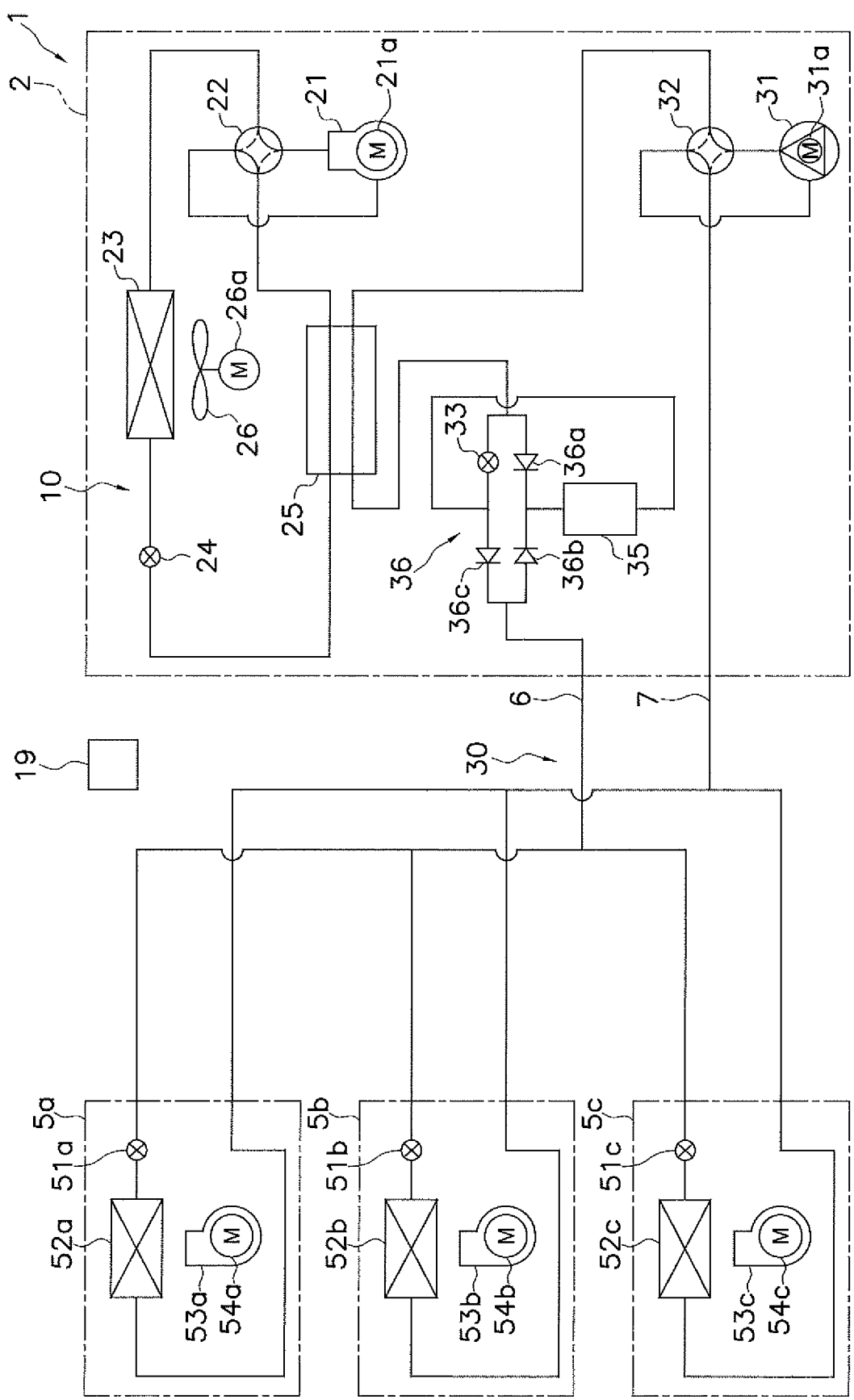
FIG. 10 is a schematic configuration diagram of a heat transport system according to one or more embodiments of the present invention.

According to one or more embodiments, in providing the receiver 35 on the liquid heat transfer medium side of the medium heat exchanger 25, as shown in FIG. 10, the receiver 35 is provided in the medium circuit 30 via a bridge circuit 36. The bridge circuit 36 includes three check valves 36a, 36b, and 36c, and the heat source side medium decompressor 33. In the state in which the first medium flow path switching device 32 is switched to the first medium radiation state, the check valve 36a allows only the flow of the heat transfer medium from the liquid heat transfer medium side of the medium heat exchanger 25 to the receiver 35. In the state in which the first medium flow path switching device 32 is switched to the first medium evaporation state, the check valve 36b allows only the flow of the heat transfer medium from the liquid medium communication pipe 6 side to the receiver 35. The check valve 36c allows only the flow of the heat transfer medium from the receiver 35 to the liquid medium communication pipe 6 side in a state in which the first medium flow path switching device 32 is switched to the first medium radiation state. The heat source side medium decompressor 33 decompresses the heat transfer medium sent from the receiver 35 to the liquid heat transfer medium side of the medium heat exchanger 25 in a state in which the first medium flow path switching device 32 is switched to the first medium evaporation state. Note that in FIG. 10, the receiver 35 is provided via the bridge circuit 36 in a configuration in which the heat transfer unit 2 is not divided into the air cooling unit 3 and the heat source unit 4; however, the present invention is not limited thereto. For example, although not shown in the drawing, in the configuration (refer to FIG. 4) in which the heat transfer unit 2 is constituted by being divided into the air cooling unit 3 and the heat source unit 4, the heat source unit 4 may be provided with the receiver 35 via the bridge circuit 36.

Similar to the configuration shown in FIG. 9, in one or more embodiments, the receiver 35 can store the heat transfer medium flowing from the liquid medium communication pipe 6 side without letting the heat transfer medium decompressed by the heat source side medium decompressor 33 in a state in which the first medium flow path switching device 32 is switched to the first medium evaporation state. In addition, even in a state in which the first medium flow path switching device 32 is switched to the first medium heat radiation state, the receiver 35 can store the heat transfer medium flowing from the liquid medium communication pipe 6 side without letting the heat transfer medium decompressed by the heat source side medium decompressor 33. Moreover, in one or more embodiments, the flow of the heat transfer medium to the receiver 35 can be rectified in a certain direction in either of the state in which the first medium flow path switching device 32 is switched to the first medium radiation state and the state in which the first medium flow path switching device 32 is switched to the first medium evaporation state, resulting in stably performing the operation of storing the heat transfer medium.

In the above-described embodiments, the receiver 35 for storing the heat transfer medium circulating through the medium circuit 30 is provided on the liquid heat transfer medium side of the medium heat exchanger 25, but the arrangement of the receiver 35 in the medium circuit 30 is not limited thereto.

Figure 11:
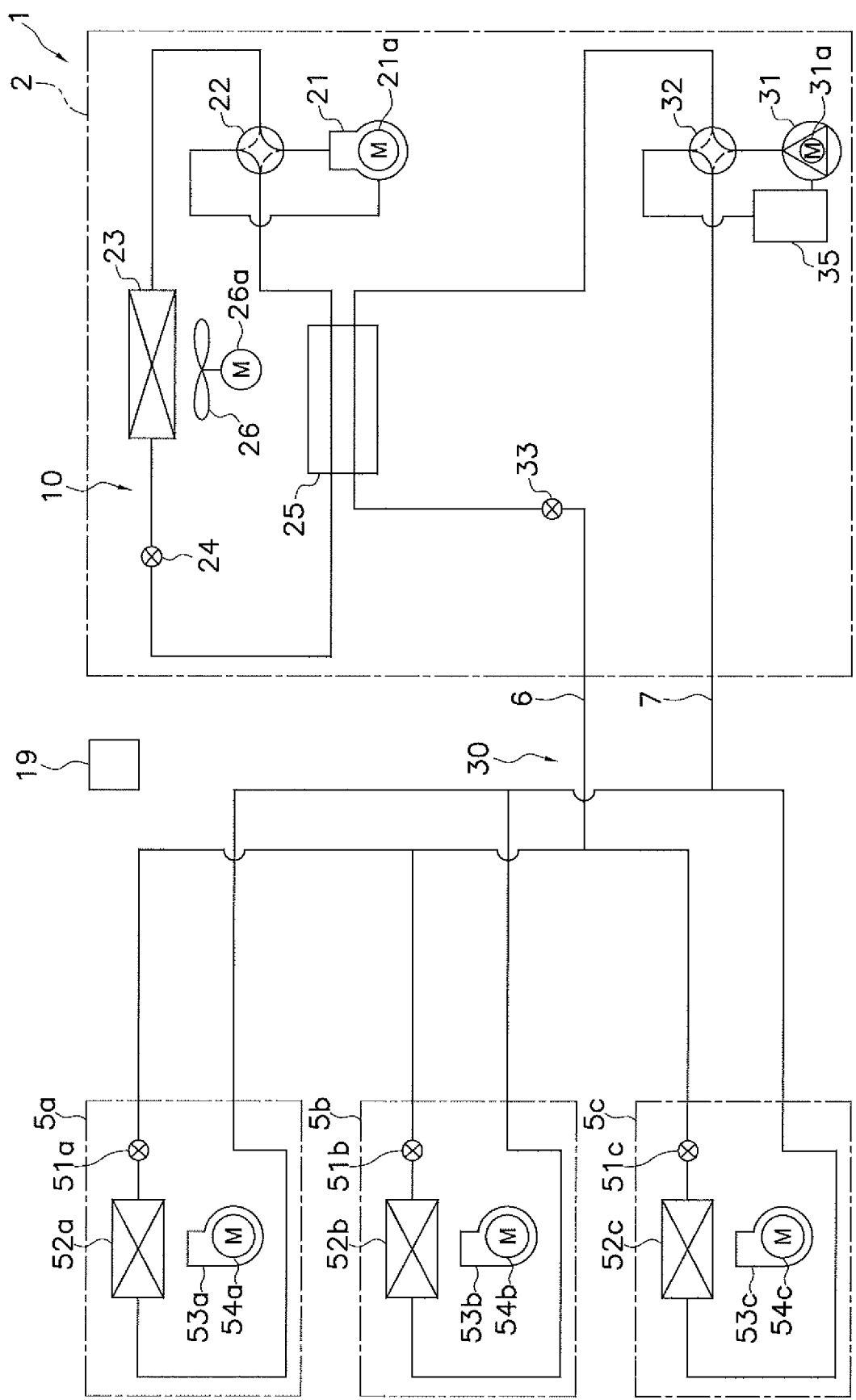
FIG. 11 is a schematic configuration diagram of a heat transport system according to one or more embodiments of the present invention.

As shown in FIG. 11, according to one or more embodiments, the receiver 35 is provided on the suction side of the medium booster 31. More specifically, the receiver 35 is provided between the first medium flow path switching device 32 and the suction side of the medium booster 31. Note that in FIG. 11, the receiver 35 is provided in a configuration in which the heat transfer unit 2 is not divided into the air cooling unit 3 and the heat source unit 4; however, the present invention is not limited thereto. For example, although not shown here in the drawing, in the configuration (refer to FIG. 4) in which the heat transfer unit 2 is constituted by being divided into the air cooling unit 3 and the heat source unit 4, the receiver 35 may be provided in the heat source unit 4.

Likewise, the configuration of one or more embodiments allows surplus heat transfer medium to be stored in the receiver 35 and the surplus heat transfer medium accumulating in the medium heat exchanger 25 and the indoor air heat exchangers 52a, 52b, and 52c can be decreased.

Configuration

Figure 12:
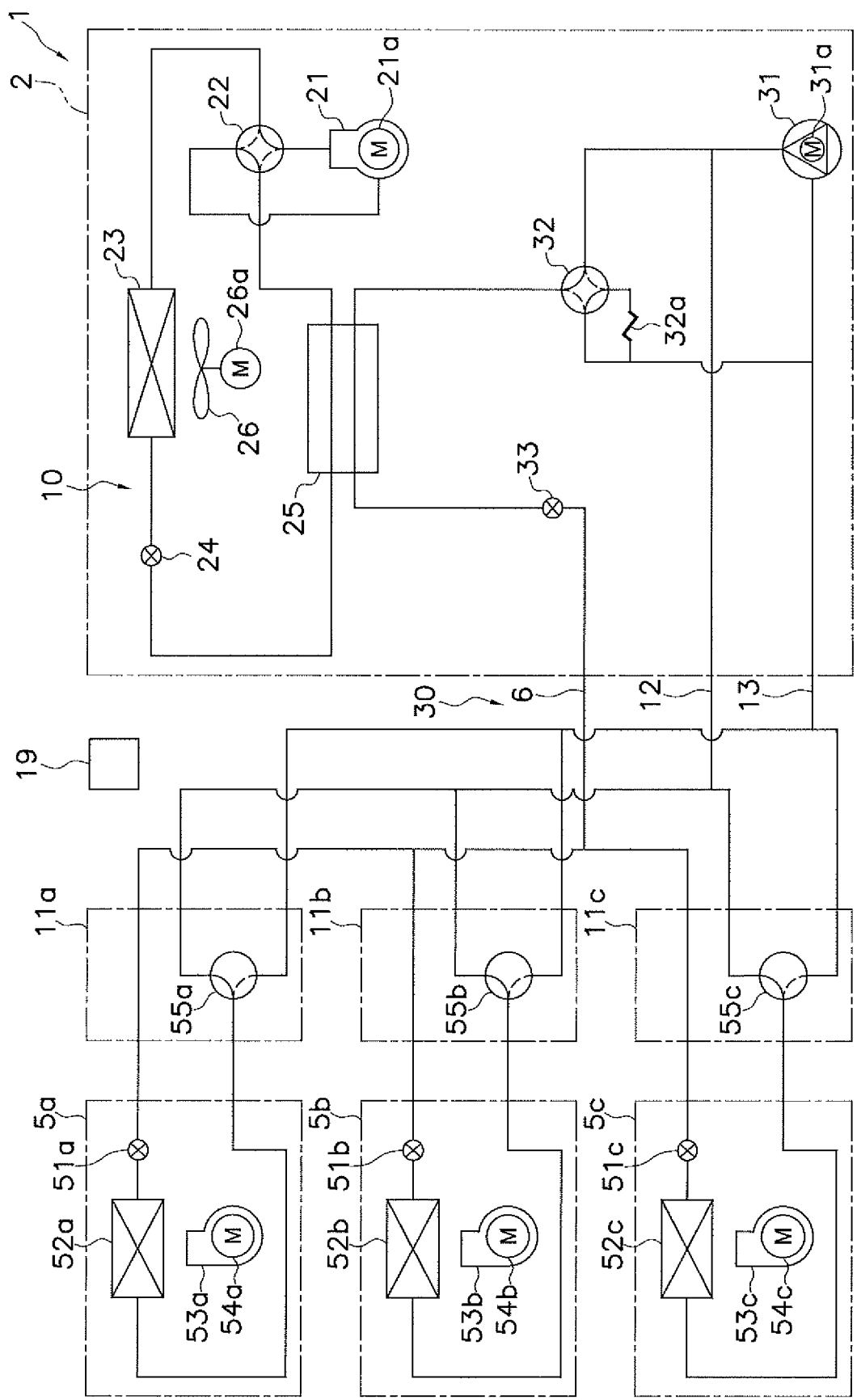
FIG. 12 is a schematic configuration diagram of a heat transport system according to one or more embodiments of the present invention.

FIG. 12 is a schematic configuration diagram of the heat transport system 1 according to one or more embodiments of the present invention.

Similarly to the above-described embodiments, the heat transport system 1 includes the refrigerant circuit 10 through which the refrigerant circulates and the medium circuit 30 through which the heat transfer medium circulates, and is a device for performing air conditioning (cooling and heating) in a room by performing heat exchange between the heat transfer medium and indoor air.

The refrigerant circuit 10 mainly includes the refrigerant booster 21, the outdoor air heat exchanger 23, the medium heat exchanger 25, and the refrigerant flow path switching device 22. A fluid containing HFC-32 and/or HFO refrigerant is sealed as the refrigerant in the refrigerant circuit 10. Here, "containing HFC-32 and/or HFO refrigerant" means that any one of the following cases are acceptable: a case in which only HFC-32 is sealed in the refrigerant circuit 10; a case in which only HFO refrigerant is sealed in the refrigerant circuit 10; or a case in which a mixture of HFC-32 and HFO refrigerant is sealed in the refrigerant circuit 10. Refrigerants such as HFO-1234yf or HFO-1234ze can be used as the HFO refrigerant. It should be noted that the refrigerant circuit 10 and the components thereof are the same as those of the refrigerant circuit 10 of the above-described embodiments, and therefore descriptions thereof are omitted here.

The medium circuit 30 mainly includes the medium booster 31, the medium heat exchanger 25, the first medium flow path switching device 32, the plurality (three, in this case) of indoor air heat exchangers 52a, 52b, and 52c, and a plurality of (three, in this case) second medium flow path switching devices 55a, 55b, and 55c. Carbon dioxide is sealed in the medium circuit 30 as the heat transfer medium. Note that the number of the indoor air heat exchangers 52a, 52b, and 52c and the second medium flow path switching devices 55a, 55b, and 55c is not limited to three, but may be two, four or more.

The medium booster 31 is a device for boosting the heat transfer medium. The medium booster 31 is the same as the medium booster 31 of the above-described embodiments, and therefore description thereof is omitted here.

The first medium flow path switching device 32 is device for switching between the first medium radiation state (refer to the solid line of the first medium flow path switching device 32 in FIG. 12) that causes the medium heat exchanger 25 to function as a radiator of the heat transfer medium, and the first medium evaporation state (refer to the broken line of the first medium flow path switching device 32 in FIG. 12) that causes the medium heat exchanger 25 to function as an evaporator of the heat transfer medium. The first medium flow path switching device 32 is, for example, a four-way switching valve. In this case, by connecting one of the four ports to the suction side of the medium booster 31 via a capillary tube 32*a*, the first medium flow path switching device 32 substantially functions as a three-way valve. The first medium flow path switching device 32 connects the discharge side of the medium booster 31 to the gas heat transfer medium side of the medium heat exchanger 25 in the first medium radiation state, and in the first medium evaporation state, connects the suction side of the medium booster 31 to the gas heat transfer medium side of the medium heat exchanger 25. It should be noted that the first medium flow path switching device 32 is not limited to a four-way switching valve. For example, a configuration may be adopted in which it may be a combination of a plurality of valves (solenoid valves or the like) configured to have the function of switching between the above-mentioned first medium radiation state and the first medium evaporation state, or a three-way valve may be used.

The medium heat exchanger 25 functions as a radiator of the heat transfer medium using the refrigerant as a cooling source in a state in which the refrigerant flow path switching device 22 is switched to the refrigerant radiation state and also the first medium flow path switching device 32 is switched to the first medium radiation state; and functions as an evaporator of the heat transfer medium using the refrigerant as a heating source in a state in which the refrigerant flow path switching device 22 is switched to the refrigerant evaporation state and also the first medium flow path switching device 32 is switched to the first medium evaporation state. The medium heat exchanger 25 is, for example, a plate type heat exchanger or a double tube type heat exchanger. The medium heat exchanger 25 is, at its gas heat transfer medium side, connected to the first medium flow path switching device 32, and its liquid heat transfer medium side is connected to the liquid heat transfer medium side of the indoor air heat exchangers 52*a*, 52*b*, and 52*c*.

Further, the medium circuit 30 includes the heat source side medium decompressor 33. The heat source side medium decompressor 33 is the same as the heat source side medium decompressor 33 of the above-described embodiments, and therefore descriptions thereof will be omitted here.

The second medium flow path switching devices 55*a*, 55*b*, and 55*c* are respectively provided for the indoor air heat exchangers 55*a*, 52*b*, and 52*c*. The second medium flow path switching devices 55*a*, 55*b*, and 55*c* are devices for switching between the second medium evaporation state (refer to the broken lines of the second medium flow path switching devices 55*a*, 55*b*, and 55*c* in FIG. 12) which causes the indoor air heat exchangers 52*a*, 52*b*, and 52*c* to function as evaporators of the heat transfer medium, and the second medium radiation state (refer to the solid lines of the second medium flow path switching devices 55*a*, 55*b*, and 55*c* in FIG. 12) which causes the indoor air heat exchangers 52*a*, 52*b*, and 52*c* to function as radiators of the heat transfer medium. The second medium flow path switching devices 55*a*, 55*b*, and 55*c* are, for example, three-way valves. Then, in the second medium evaporation state, the second medium flow path switching devices 55*a*, 55*b*, and 55*c* connect the suction side of the medium booster 31 to the gas heat transfer medium side of the indoor air heat exchangers 52*a*, 52*b*, and 52*c*. In the second medium radiation state, the second medium flow path switching devices 55*a*, 55*b*, and 55*c* connect the discharge side of the medium booster 31 to the gas heat transfer medium side of the indoor air heat exchangers 52*a*, 52*b*, and 52*c*. Note that the second medium flow path switching devices 55*a*, 55*b*, and 55*c* are not limited to the three-way valve. For example, a configuration may be adopted in which a combination of a plurality of valves (solenoid valves or the like) configured to have the function of switching between the above-described second medium evaporation state and the second medium radiation state.

Further, the medium circuit 30 includes utilization side medium decompressors 51*a*, 51*b*, and 51*c* corresponding to the indoor air heat exchangers 52*a*, 52*b*, and 52*c*, respectively. The utilization side medium decompressors 51*a*, 51*b*, and 51*c* are devices for decompressing the heat transfer medium. The utilization side medium decompressors 51*a*, 51*b*, and 51*c* are electric expansion valves, for example. In a state in which the second medium flow path switching devices 55*a*, 55*b*, and 55*c* are switched to the second medium radiation state, the heat transfer medium is decompressed by the utilization side medium decompressors 51*a*, 51*b*, and 51*c* and sent to the indoor air heat exchangers 52*a*, 52*b*, and 52*c*. In a state in which the second medium flow path switching devices 55*a*, 55*b*, and 55*c* are switched to the second medium evaporation state, the utilization side medium decompressors 51*a*, 51*b*, and 51*c* decompress the heat transfer medium which has radiated heat in the indoor air heat exchangers 52*a*, 52*b*, and 52*c*. One end side of each of the utilization side medium decompressors 51*a*, 51*b*, and 51*c* is connected to the liquid heat transfer medium side of the medium heat exchanger 25 via the heat source side medium decompressor 33, the other end side is connected to the liquid heat transfer medium side of the indoor air heat exchangers 52*a*, 52*b*, and 52*c*.

The indoor air heat exchangers 52*a*, 52*b*, and 52*c* are devices for exchanging heat between the heat transfer medium and the indoor air. The indoor air heat exchangers 52*a*, 52*b*, and 52*c* are, for example, fin-and-tube heat exchangers. The indoor air heat exchangers 52*a*, 52*b*, and 52*c* function as radiators of the heat transfer medium using the indoor air as a cooling source in a state where the second medium flow path switching devices 55*a*, 55*b*, and 55*c* are switched to the second medium radiation state, and function as evaporators of the heat transfer medium using the indoor air as a heating source in a state in which the second medium flow path switching devices 55*a*, 55*b*, and 55*c* are switched to the second medium evaporation state. The indoor air heat exchangers 52*a*, 52*b*, and 52*c* are connected to the second medium flow path switching devices 55*a*, 55*b*, and 55*c* on the side of the gas heat transfer medium side, and liquid heat transfer medium side thereof is connected to the liquid heat transfer medium side of the medium heat exchanger 25 via the medium decompressors 51*a*, 51*b*, 51*c*, and 33.

The constituent devices of the above-described refrigerant circuit 10 and the medium circuit 30 are provided in the heat transfer unit 2, the plurality (three, in this case) of utilization units 5*a*, 5*b*, and 5*c*, and a plurality (three, in this case) of relay units 11*a*, 11*b*, and 11*c*, respectively. The utilization units 5*a*, 5*b*, and 5*c* and the relay units 11*a*, 11*b*, and 11*c* are each provided corresponding to the indoor air heat exchangers 52*a*, 52*b*, and 52*c*, respectively.

The heat transfer unit 2 is disposed outdoors. The refrigerant circuit 10 including the medium heat exchanger 25 and the medium booster 31 and the first medium flow path switching device 32 of the medium circuit 30 are provided in the heat transfer unit 2. The heat source side medium decompressor 33 of the medium circuit 30 is also provided in the heat transfer unit 2. In addition, the outdoor fan 26 for supplying outdoor air to the outdoor air heat exchanger 23 is provided in the heat transfer unit 2. The outdoor fan 26 is a fan that drives a blowing component such as a propeller fan using an outdoor fan driving mechanism 26a which is a motor.

The utilization units 5a, 5b, 5c are disposed indoors. The indoor air heat exchangers 52a, 52b, and 52c of the medium circuit 30 are provided in the utilization units 5a, 5b, and 5c. The utilization side medium decompressors 51a, 51b, and 51c of the medium circuit 30 are also provided in the utilization units 5a, 5b, and 5c. In addition, the indoor fans 53a, 53b, 53c for supplying indoor air to the indoor air heat exchangers 52a, 52b, and 52c are provided in the utilization units 5a, 5b, and 5c. The indoor fans 53a, 53b, and 53c are each a fan that drives a blowing component such as a centrifugal fan or a multi-blade fan using the indoor fan driving mechanisms 54a, 54b, and 54c which are motors.

The heat transfer unit 2 and the utilization units 5a, 5b, and 5c are connected to each other by medium communication pipes 6, 12, 13 constituting a part of the medium circuit 30 via the relay units 11a, 11b, and 11c. The liquid medium communication pipe 6 is a pipe connecting the liquid heat transfer medium side of the medium heat exchanger 25 to one end of the utilization side medium decompressors 51a, 51b, and 51c. The second medium flow path switching devices 55a, 55b, and 55c of the medium circuit 30 are provided in the relay units 11a, 11b, and 11c. The high-pressure gas medium communication pipe 12 is a pipe connecting the discharge side of the medium booster 31 and the second medium flow path switching devices 55a, 55b, and 55c. The low-pressure gas medium communication pipe 13 is a pipe connecting the suction side of the medium booster 31 to the second medium flow path switching devices 55a, 55b, and 55c. The second medium flow path switching devices 55a, 55b, and 55c of the relay units 11a, 11b, and 11c are connected to the gas heat transfer medium side of the indoor air heat exchangers 52a, 52b, and 52c.

The constituent devices of the heat transfer unit 2, the utilization units 5a, 5b, and 5c, and the relay units 11a, 11b, and 11c are controlled by the control unit 19. The control unit 19 is configured by communicatively connecting between control boards (not shown) and the like provided in the heat transfer unit 2, the utilization units 5a, 5b, and 5c, and the relay units 11a, 11b, and 11c, etc. Note that in FIG. 12, for the sake of convenience, the control unit 19 is shown at a position away from the heat transfer unit 2, the utilization units 5a, 5b, and 5c, the relay units 11a, 11b, and 11c, and the like. The control unit 19 controls the constituents devices 21, 22, 24, 26, 31, 32, 33, 51a 51b, 51c, 53a, 53b, 53c, 55a, 55b, and 55c of the heat transport system 1 (in this case, the heat transfer unit 2, the utilization units 5a, 5b, and 5c, and the relay units 11a, 11b, and 11c); that is, to control the entire operation of the heat transport system 1.

As described above, the heat transport system 1 includes the following: the heat transfer unit 2; the plurality (in this case, three) of utilization units 5a, 5b and 5c connected in parallel to each other; the relay units 11a, 11b, and 11c provided for each of the utilization units 5a, 5b and 5c; the medium communication pipes 6, 12, and 13 for connecting the heat transfer unit 2 to the utilization units 5a, 5b, and 5c via the relay units 11a, 11b, and 11c; and the control unit 19 for controlling the constituent devices of the heat transfer unit 2, the utilization units 5a, 5b, and 5c, and the relay units 11a, 11b, and 11c.

Operation and Characteristics

Figure 13:
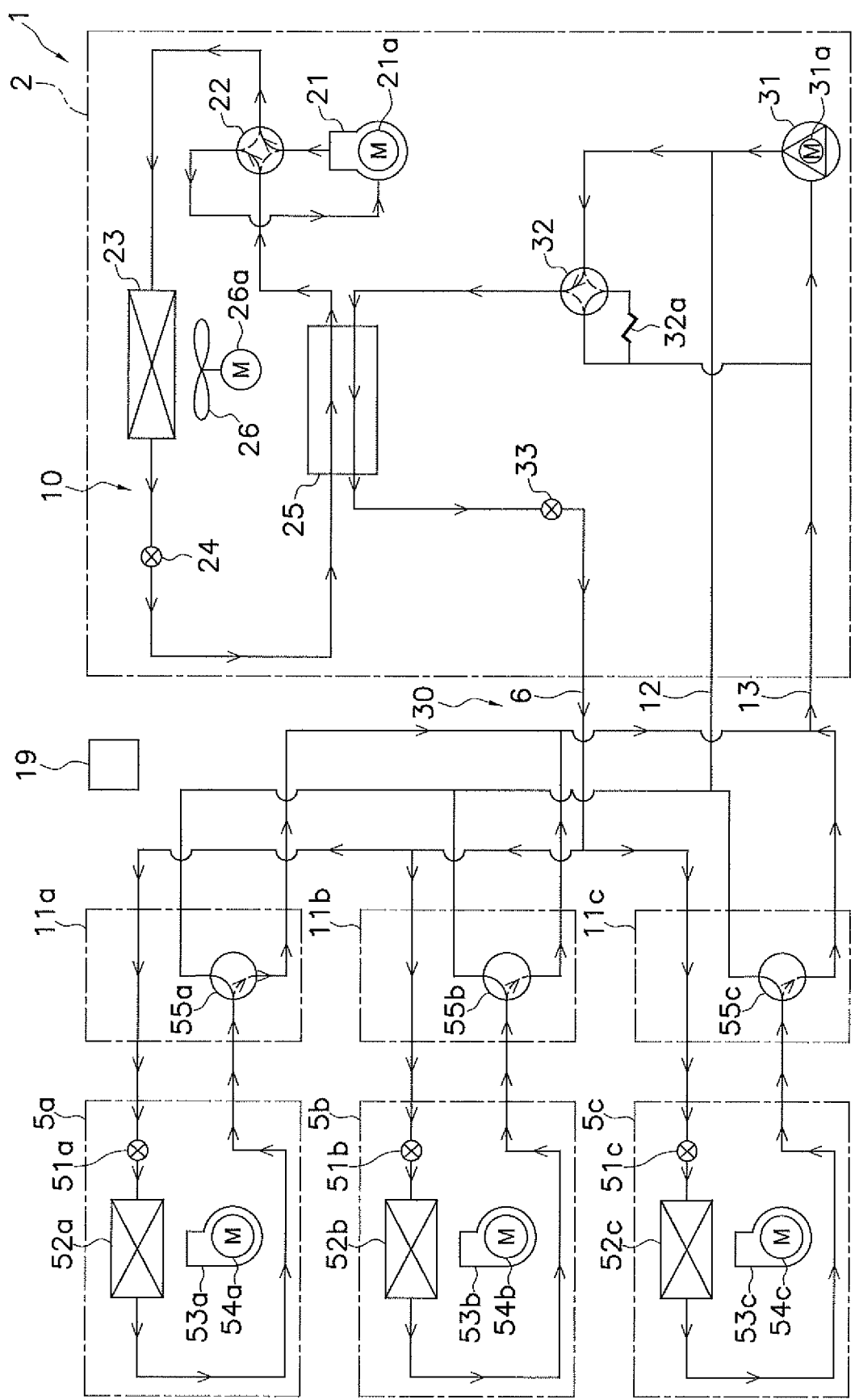
FIG. 13 is a diagram illustrating an action (a flow of the refrigerant and the heat transfer medium) in an overall-cooling operation of the heat transport system according to one or more embodiments of the present invention.
Figure 14:
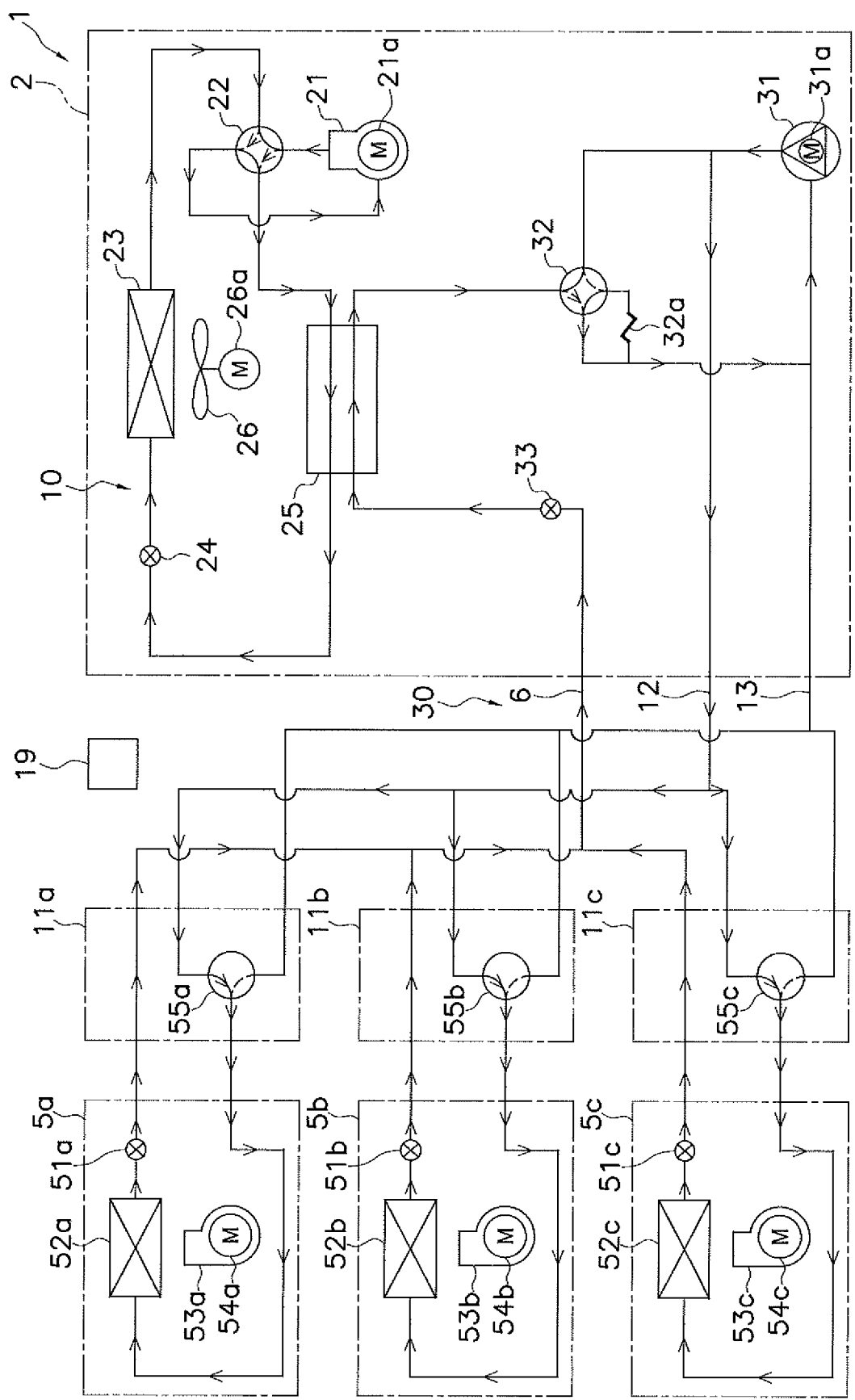
FIG. 14 is a diagram illustrating an action (a flow of the refrigerant and the heat transfer medium) in an overall-heating operation of the heat transport system according to one or more embodiments of the present invention.
Figure 15:
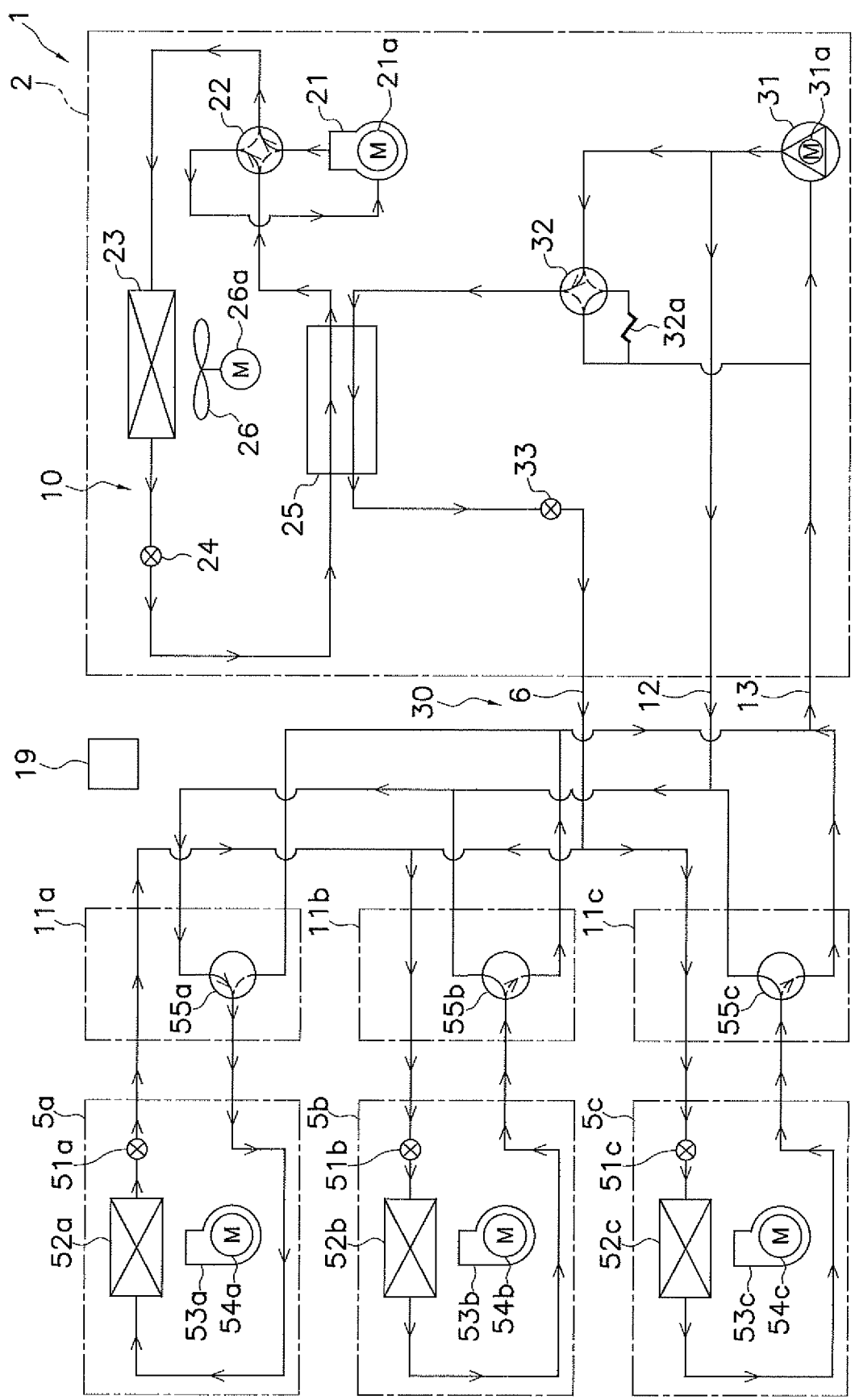
FIG. 15 is a diagram illustrating an action (a flow of the refrigerant and the heat transfer medium) in a cooling-dominant operation of the heat transport system according to one or more embodiments of the present invention.
Figure 16:
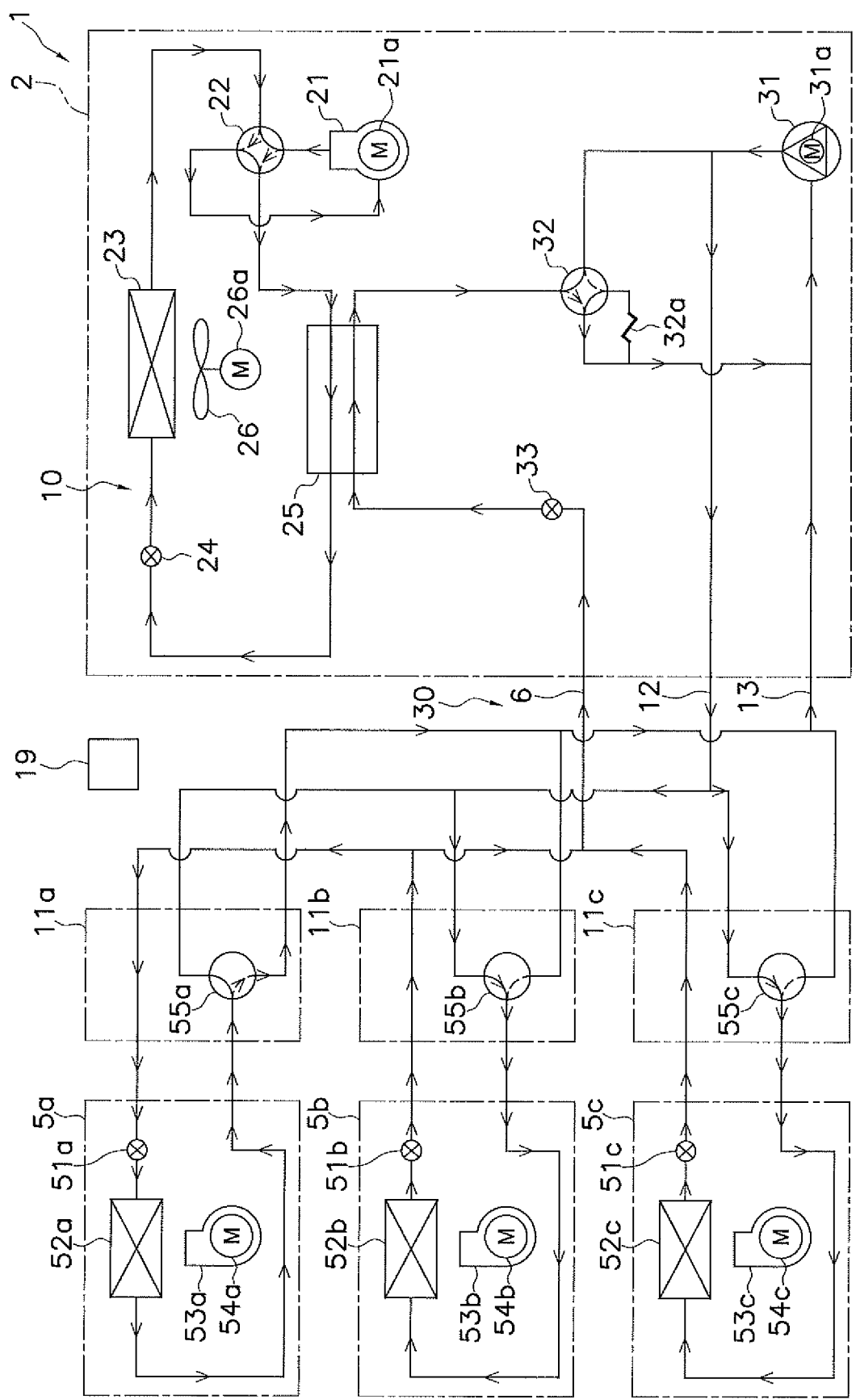
FIG. 16 is a diagram illustrating an action (a flow of the refrigerant and the heat transfer medium) in a heating-dominant operation of the heat transport system according to one or more embodiments of the present invention.

Next, the operation and characteristics of the heat transport system 1 will be described with reference to FIGS. 12 to 16. Herein, FIG. 13 is a diagram illustrating an action (a flow of the refrigerant and the heat transfer medium) in an overall-cooling operation of the heat transport system 1 according to one or more embodiments of the present invention, FIG. 14 is a diagram illustrating an operation in an overall-heating operation, FIG. 15 is a diagram illustrating an operation (a flow of the refrigerant and the heat transfer medium) in a cooling-dominant operation, and FIG. 16 is a diagram illustrating an operation (a flow of the refrigerant and the heat transfer medium) in a heating-dominant operation. The heat transport system 1 is capable of performing an overall-cooling operation for cooling the indoor air in all the indoor rooms, an overall-heating operation for heating the indoor air in all the indoor rooms, and a cooling-dominant operation or a heating-dominant operation in which cooling operation and heating operation are mixed, thereby performing indoor air conditioning. Note that the overall-cooling operation, the overall-heating operation, the cooling-dominant operation, and the heating-dominant operation are performed by the control unit 19.

Overall-Cooling Operation

During the overall-cooling operation, for example, when all the utilization units 5a, 5b, 5c perform the cooling operation (that is, all of the indoor air heat exchangers 52a, 52b, and 52c function as evaporators of the heat transfer medium to cool the indoor air), the refrigerant flow path switching device 22 is switched to the refrigerant radiation state (refer to the solid line of the refrigerant flow path switching device 22 in FIG. 13), the first medium flow path switching device 32 is switched to the first medium radiation state (refer to the solid line of first medium flow path switching device 32 in FIG. 13), and the second medium flow path switching devices 55a, 55b, and 55c are switched to the second medium evaporation state (refer to the broken lines of the second medium flow path switching devices 55a, 55b, and 55c in FIG. 13).

Then, the refrigerant discharged from the refrigerant booster 21 is sent to the outdoor air heat exchanger 23 through the refrigerant flow path switching device 22. The refrigerant sent to the outdoor air heat exchanger 23 is cooled by exchanging heat with the outdoor air supplied by the outdoor fan 26 in the outdoor air heat exchanger 23 functioning as a radiator of the refrigerant, and thereby condensed. Thereafter, the refrigerant that has radiated heat in the outdoor air heat exchanger 23 is sent to the medium heat exchanger 25 after being decompressed by the refrigerant decompressor 24. The refrigerant sent to the medium heat exchanger 25 is heated by exchanging heat with the heat transfer medium in the medium heat exchanger 25 functioning as an evaporator of the refrigerant, and thereby evaporated. The refrigerant that has evaporated in the medium heat exchanger 25 is sucked into the refrigerant booster 21 through the refrigerant flow path switching device 22 and discharged again from the refrigerant booster 21.

On the other hand, the heat transfer medium discharged from the medium booster 31 is sent to the medium heat exchanger 25 through the first medium flow path switching device 32. The heat transfer medium sent to the medium heat exchanger 25 is cooled through heat exchange with the refrigerant in the medium heat exchanger 25 functioning as an evaporator of the heat transfer medium. The heat transfer medium that has radiated heat in the medium heat exchanger 25 is introduced through the heat source side medium decompressor 33 to the liquid medium communication pipe 6 and diverged therefrom. The heat transfer medium diverged from the liquid medium communication pipe 6 is sent to the respective indoor air heat exchangers 52a, 52b, and 52c after being decompressed by the utilization side medium decompressors 51a, 51b, and 51c. In the indoor air heat exchangers 52a, 52b, and 52c functioning as evaporators of the heat transfer medium, the heat transfer medium sent to the indoor air heat exchangers 52a, 52b, and 52c is cooled by exchanging heat with the indoor air supplied by the indoor fans 53a, 53b, and 53c, and thereby evaporated. As a result, a cooling operation for cooling indoor air is performed. The heat transfer medium that has evaporated in the indoor air heat exchangers 52a, 52b, and 52c is introduced through the second medium flow path switching devices 55a, 55b, and 55c to the low-pressure gas medium communication pipe 13 and merged therein. The heat transfer medium merged in the low-pressure gas medium communication pipe 13 is sucked into the medium booster 31 and discharged again from the medium booster 31.

Overall-Heating Operation

During the overall-heating operation, for example, when all of the utilization units 5a, 5b, and 5c perform the heating operation (that is, all of the indoor air heat exchangers 52a, 52b, and 52c function as radiators of the heat transfer medium to heat the indoor air), the refrigerant flow path switching device 22 is switched to the refrigerant evaporation state (refer to the broken line of the refrigerant flow path switching device 22 in FIG. 14), the first medium flow path switching device 32 is switched to the first medium radiation state (refer to the broken line of the first medium flow path switching device 32 in FIG. 14), and the second medium flow path switching devices 55a, 55b, and 55c are switched to the second medium radiation state (refer to the solid lines of the second medium flow path switching devices 55a, 55b, and 55c in FIG. 14).

Then, the refrigerant discharged from the refrigerant booster 21 is sent to the medium heat exchanger 25 through the refrigerant flow path switching device 22. The refrigerant sent to the medium heat exchanger 25 is cooled by exchanging heat with the heat transfer medium in the medium heat exchanger 25 functioning as a radiator of the refrigerant, and thereby condensed. The refrigerant that has radiated heat in the medium heat exchanger 25 is sent to the outdoor air heat exchanger 23 after being decompressed by the refrigerant decompressor 24. The refrigerant sent to the outdoor air heat exchanger 23 is heated by exchanging heat with the outdoor air supplied by the outdoor fan 26 in the outdoor air heat exchanger 23 functioning as an evaporator of the refrigerant, and thereby evaporated. The refrigerant that has evaporated in the outdoor air heat exchanger 23 is sucked into the refrigerant booster 21 through the refrigerant flow path switching device 22 and discharged again from the refrigerant booster 21.

On the other hand, the heat transfer medium discharged from the medium booster 31 is sent to the high-pressure gas medium communication pipe 12 and diverged therefrom. The heat transfer medium that has diverged from the high-pressure gas medium communication pipe 12 is introduced to the indoor air heat exchangers 52a, 52b, and 52c through the second medium flow path switching devices 55a, 55b, and 55c, respectively. In the indoor air heat exchangers 52a, 52b, and 52c functioning as radiators of the heat transfer medium, the heat transfer medium sent to the indoor air heat exchangers 52a, 52b, and 52c is cooled by exchanging heat with the indoor air supplied by the indoor fans 53a, 53b, and 53c. As a result, a heating operation for heating the indoor air is performed. After being decompressed by the utilization side medium decompressors 51a, 51b, and 51c, the heat transfer medium that has radiated heat in the indoor air heat exchangers 52a, 52b, and 52c is sent to the liquid medium communication pipe 6 and merged therein. The heat transfer medium merged in the liquid medium communication pipe 6 is further decompressed by the heat source side medium decompressor 33; thereafter sent to the medium heat exchanger 25. The heat transfer medium sent to the medium heat exchanger 25 is heated by exchanging heat with the refrigerant in the medium heat exchanger 25 functioning as an evaporator of the heat transfer medium, and thereby evaporated. The heat transfer medium evaporated in the medium heat exchanger 25 is sucked into the medium booster 31 through the first medium flow path switching device 32 and discharged again from the medium booster 31.

Cooling-dominant Operation

During the cooling-dominant operation, for example, when the utilization units 5b and 5c perform the cooling operation (that is, the operation in which the indoor air heat exchangers 52b and 52c function as evaporators of the heat transfer medium to cool the indoor air) and the utilization unit 5a performs the heating operation (that is, the operation in which the indoor air heat exchanger 52a functions as a radiator of the heat transfer medium to heat the indoor air), the following flow path switching devices are switched: the refrigerant flow path switching device 22 is switched to a refrigerant radiation state (refer to the solid line of the refrigerant flow path switching device 22 in FIG. 15); the first medium flow path switching device 32 is switched to the first medium radiation state (refer to the solid line of the first medium flow path switching device 32 in FIG. 15); the second medium flow path switching devices 55b and 55c are switched to the second medium evaporation state (refer to the broken line of the second medium flow path switching devices 55b and 55c in FIG. 15); and the second medium flow path switching device 55a is switched to the second medium radiation state (refer to the solid line of the second medium flow path switching device 55a in FIG. 15).

Then, the refrigerant discharged from the refrigerant booster 21 is sent to the outdoor air heat exchanger 23 through the refrigerant flow path switching device 22. The refrigerant sent to the outdoor air heat exchanger 23 is cooled by exchanging heat with the outdoor air supplied by the outdoor fan 26 in the outdoor air heat exchanger 23 functioning as a radiator of the refrigerant, and thereby condensed. Thereafter, the refrigerant that has radiated heat in the outdoor air heat exchanger 23 is sent to the medium heat exchanger 25 after being decompressed by the refrigerant decompressor 24. The refrigerant sent to the medium heat exchanger 25 is heated by exchanging heat with the heat transfer medium in the medium heat exchanger 25 functioning as an evaporator of the refrigerant, and thereby evaporated. The refrigerant that has evaporated in the medium heat exchanger 25 is sucked into the refrigerant booster 21 through the refrigerant flow path switching device 22 and discharged again from the refrigerant booster 21.

On the other hand, a portion of the heat transfer medium discharged from the medium booster 31 is sent to the medium heat exchanger 25 through the first medium flow path switching device 32 while the rest is sent to the high-pressure gas medium communication pipe 12.

The heat transfer medium sent to the medium heat exchanger 25 is cooled by means of heat exchange with the refrigerant in the medium heat exchanger 25 functioning as an evaporator of the heat transfer medium. The heat transfer medium that has radiated heat in the medium heat exchanger 25 is sent to the liquid medium communication pipe 6 through the heat source side medium decompressor 33.

The heat transfer medium sent to the high-pressure gas medium communication pipe 12 is sent to the indoor air heat exchanger 52a through the second medium flow path switching device 55a. The heat transfer medium sent to the indoor air heat exchanger 52a is cooled by means of heat exchange with the indoor air supplied by the indoor fan 53a in the indoor air heat exchanger 52a functioning as a radiator of the heat transfer medium. As a result, a heating operation for heating the indoor air is performed. The heat transfer medium that has radiated heat in the indoor air heat exchanger 52a is decompressed by the utilization side medium decompressor 51a, and thereafter sent to the liquid medium communication pipe 6 where it is merged with the heat transfer medium that has been sent to the liquid medium communication pipe 6 through the heat source side medium decompressor 33.

The heat transfer medium sent to the liquid medium communication pipe 6 is diverged and sent to the utilization side medium decompressors 51b and 51c. The heat transfer medium is then sent to the indoor air heat exchangers 52b and 52c after being decompressed by utilization side medium decompressors 51b and 51c. The heat transfer medium sent to the indoor air heat exchangers 52b and 52c is cooled by means of heat exchange with the indoor air supplied by the indoor fans 53b and 53c in the indoor air heat exchangers 52b and 52c functioning as evaporators of the heat transfer medium, and thereby evaporated. As a result, a cooling operation for cooling indoor air is performed. The heat transfer medium that has evaporated in the indoor air heat exchangers 52b and 52c is introduced through the second medium flow path switching devices 55b and 55c to the low-pressure gas medium communication pipe 13 and merged therein. The heat transfer medium that has merged in the low-pressure gas medium communication pipe 13 is sucked into the medium booster 31 and discharged again from the medium booster 31.

Heating-Dominant Operation

During the heating-dominant operation, for example, when the utilization units 5b and 5c perform the heating operation (that is, the operation in which the indoor air heat exchangers 52b and 52c function as radiators of the heat transfer medium to heat the indoor air) and the utilization unit 5a performs the cooling operation (that is, the operation in which the indoor air heat exchanger 52a functions as an evaporator of the heat transfer medium to cool the indoor air), the following flow path switching devices are switched: the refrigerant flow path switching device 22 is switched to the refrigerant evaporation state (refer to the broken line of the refrigerant flow path switching device 22 in FIG. 16); the first medium flow path switching device 32 is switched to the first medium evaporation state (refer to the broken line of the first medium flow path switching device 32 in FIG. 16); the second medium flow path switching devices 55b and 55c are switched to the second medium radiation state (refer to the solid lines of the second medium flow path switching devices 55b and 55c in FIG. 16); and the second medium flow path switching device 55a is switched to the second medium evaporation state (refer to the broken line of the second medium flow path switching device 55a in FIG. 16).

Then, the refrigerant discharged from the refrigerant booster 21 is sent to the medium heat exchanger 25 through the refrigerant flow path switching device 22. The refrigerant sent to the medium heat exchanger 25 is cooled by exchanging heat with the heat transfer medium in the medium heat exchanger 25 functioning as a radiator of the refrigerant, and thereby condensed. The refrigerant that has radiated heat in the medium heat exchanger 25 is sent to the outdoor air heat exchanger 23 after being decompressed by the refrigerant decompressor 24. The refrigerant sent to the outdoor air heat exchanger 23 is heated by exchanging heat with the outdoor air supplied by the outdoor fan 26 in the outdoor air heat exchanger 23 functioning as an evaporator of the refrigerant, and thereby evaporated. The refrigerant that has evaporated in the outdoor air heat exchanger 23 is sucked into the refrigerant booster 21 through the refrigerant flow path switching device 22 and discharged again from the refrigerant booster 21.

On the other hand, the heat transfer medium discharged from the medium booster 31 is sent to the high-pressure gas medium communication pipe 12 and diverged therefrom. The heat transfer medium that has diverged from the high-pressure gas medium communication pipe 12 is introduced to the indoor air heat exchangers 52b and 52c through the second medium flow path switching devices 55b and 55c, respectively. The heat transfer medium introduced to the indoor air heat exchangers 52b and 52c is cooled by exchanging heat with the indoor air supplied by the indoor fans 53b and 53c in the indoor air heat exchangers 52b and 52c functioning as radiators of the heat transfer medium. As a result, the heating operation for heating the indoor air is performed. After being decompressed by the utilization side medium decompressors 51b and 51c, the heat transfer medium that has radiated heat in the indoor air heat exchangers 52b and 52c is sent to the liquid medium communication pipe 6 and merged therein. The heat transfer medium that has merged in the liquid medium communication pipe 6 is partially diverged, and the diverged portion of the heat transfer medium is sent to the utilization side medium decompressor 51a while the rest is sent to the heat source side medium decompressor 33.

The heat transfer medium sent to the utilization side medium decompressor 51a is decompressed by the utilization side medium decompressor 51a and then sent to the indoor air heat exchanger 52a. The heat transfer medium sent to the indoor air heat exchanger 52a is cooled by exchanging heat with the indoor air supplied by the indoor fan 53a in the indoor air heat exchanger 52a functioning as an evaporator of the heat transfer medium, thereby evaporated. As a result, a cooling operation for cooling indoor air is performed. The heat transfer medium that has evaporated in the indoor air heat exchanger 52a is sent to the low-pressure gas medium communication pipe 13 through the second medium flow path switching device 55a. The heat transfer medium sent to the low-pressure gas medium communication pipe 13 is sent to the medium booster 31.

The heat transfer medium sent to the heat source side medium decompressor 33 is further decompressed by the heat source side medium decompressor 33 and then sent to the medium heat exchanger 25. The heat transfer medium sent to the medium heat exchanger 25 is heated by exchanging heat with the refrigerant in the medium heat exchanger 25 functioning as an evaporator of the heat transfer medium, and thereby evaporated. The heat transfer medium that has evaporated in the medium heat exchanger 25 is sent to the medium booster 31 through the first medium flow path switching device 32, then together with the heat transfer medium sent to the low pressure gas medium communication pipe 13, both are sucked into the medium booster 31 and discharged again from the medium booster 31.

Characteristics

Here, similarly to the heat transport system 1 of the above-described embodiments, the refrigerant in the refrigerant circuit 10 can be circulated while the refrigerant flow path switching device 22 is switched to the refrigerant radiation state; and the heat transfer medium in the medium circuit 30 can be circulated while the first medium flow path switching device 32 is switched to the first medium radiation state (refer to FIGS. 13 and 15). In this case, in the medium heat exchanger 25, the heat transfer medium radiates heat due to the evaporation of the refrigerant, and therefore cold heat is transferred from the refrigerant circuit 10 to the medium circuit 30. Further, the refrigerant flow path switching device 22 is switched to the refrigerant evaporation state, allowing the refrigerant in the refrigerant circuit 10 to circulate; and the first medium flow path switching device 32 is switched to the first medium evaporation state, allowing the heat transfer medium in the medium circuit 30 to circulate (refer to FIGS. 14 and 16). In this case, in the medium the exchanger 25, the heat transfer medium evaporates due to the radiation of the refrigerant, and therefore hot heat is transferred from the refrigerant circuit 10 to the medium circuit 30. This configuration allows the operation of transferring the cold heat from the refrigerant circuit 10 to the medium circuit 30 and the operation of transferring hot heat from the refrigerant circuit 10 to the medium circuit 30 to be switched and performed by the refrigerant flow path switching device 22 provided in the refrigerant circuit 10 and by the first medium flow path switching device 32 provided in the medium circuit 30. The cold or hot heat transferred from the refrigerant circuit 10 to the medium circuit 30 by the above operations is further transferred to the room air by the heat exchange between the heat transfer medium and the indoor air in the indoor air heat exchanges 52a, 52b, and 52c; thus, indoor air conditioning (cooling and heating) can be performed.

Particularly, here, when circulating the heat transfer medium in the medium circuit 30 in a state where the first medium flow path switching device 32 is switched to the first medium radiation state or to the second medium radiation state and in a state where the second medium flow path switching devices 55a, 55b, and 55c are switched to the second medium evaporation state, the corresponding indoor air heat exchangers 52a, 52b, and 52c function as evaporators of the heat transfer medium. Therefore, in the indoor air heat exchanges 52a, 52b, and 52c corresponding to the second medium flow path switching devices 55a, 55b, and 55c that are switched to the second medium evaporation state, heat exchange between the heat transfer medium and indoor air cools the indoor air, thereby enabling cooling of the room. In addition, when circulating the heat transfer medium in the medium circuit 30 in a state in which the first medium flow path switching device 32 is switched to the first medium radiation state or to the second medium radiation state and in a state in which the second medium flow path switching devices 55a, 55b, and 55c are switched to the second medium radiation state, the corresponding indoor air heat exchangers 52a, 52b, and 52c function as radiators of the heat transfer medium. Therefore, in the indoor air heat exchanges 52a, 52b, and 52c corresponding to the second medium flow path switching devices 55a, 55b, and 55c that are switched to the second medium radiation state, heat exchange between the heat transfer medium and indoor air heats the indoor air, thereby enabling heating of the room. With this configuration, the refrigerant flow path switching device 22 provided in the refrigerant circuit 10, the first medium flow path switching device 32 provided in the medium circuit 30 and the second medium flow path switching device 55a, 55b, and 55c enable the indoor air heat exchanges 52a, 52b, and 52c to be individually switched to thereby perform the operation of cooling or heating a room.

Although detailed descriptions will be omitted here, similarly to the heat transport system 1 of the above-described embodiments, it is possible to reduce the pipe diameter of the pipe constituting the medium circuit 30 as well as capable of reducing environmental load and improving safety. In addition, even if the refrigerant leaks from the refrigerant circuit 10, it is possible to reliably eliminate the risk of the refrigerant leaking into the room. This configuration also allows many of the devices constituting the heat transport system 1 to be collectively arranged outdoors; thus, minimizing the number of devices disposed inside the room and achieving compactness of the utilization units 5a, 5b, and 5c.

Likewise, in one or more embodiments, although detailed description will be omitted, similar to the above-described embodiments, the pipe diameter of the pipe constituting the medium circuit 30 may be limited to ⅜ inch or less.

Figure 17:
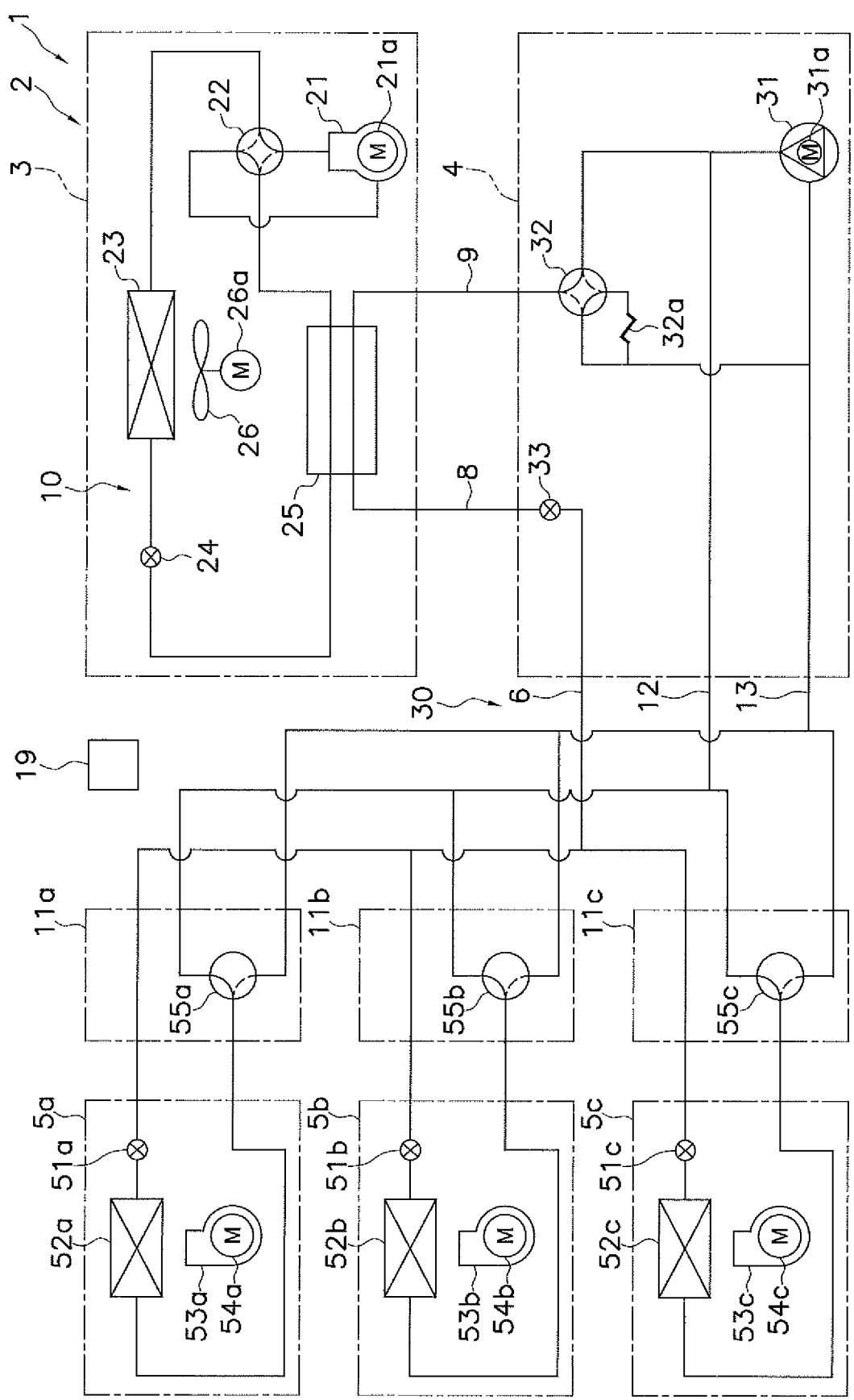
FIG. 17 is a schematic configuration diagram of a heat transport system according to one or more embodiments of the present invention.

Likewise, in one or more embodiments, although detailed description will be omitted, the refrigerant circuit 10 may be provided in the air cooling unit 3, and a part of the medium circuit 30 in the heat transfer unit 2 except the medium heat exchanger 25 may be provided in the heat source unit 4 (refer to FIG. 17) as in the above-described embodiments.

Likewise, in one or more embodiments, although detailed description will be omitted, similar to the above-described embodiments, the medium booster 31 having a motor, as the medium booster driving mechanism 31a, whose rotation speed is controlled by an inverter may be employed.

Likewise, in one or more embodiments, although detailed description will be omitted, a rotary compressor (refer to FIGS. 5 and 6) may be used as the medium booster 31 as in the above-described embodiments.

Likewise, in one or more embodiments, although detailed description will be omitted, similar to the above-described embodiments, an oil-less turbo compressor configured to support the rotating shaft 31e by magnetic bearings 45 and 46 (refer to FIG. 7) or an oil-less turbo compressor configured to support the rotating shaft 31e with a gas bearing (not shown) may be used as the medium booster 31.

Figure 18:
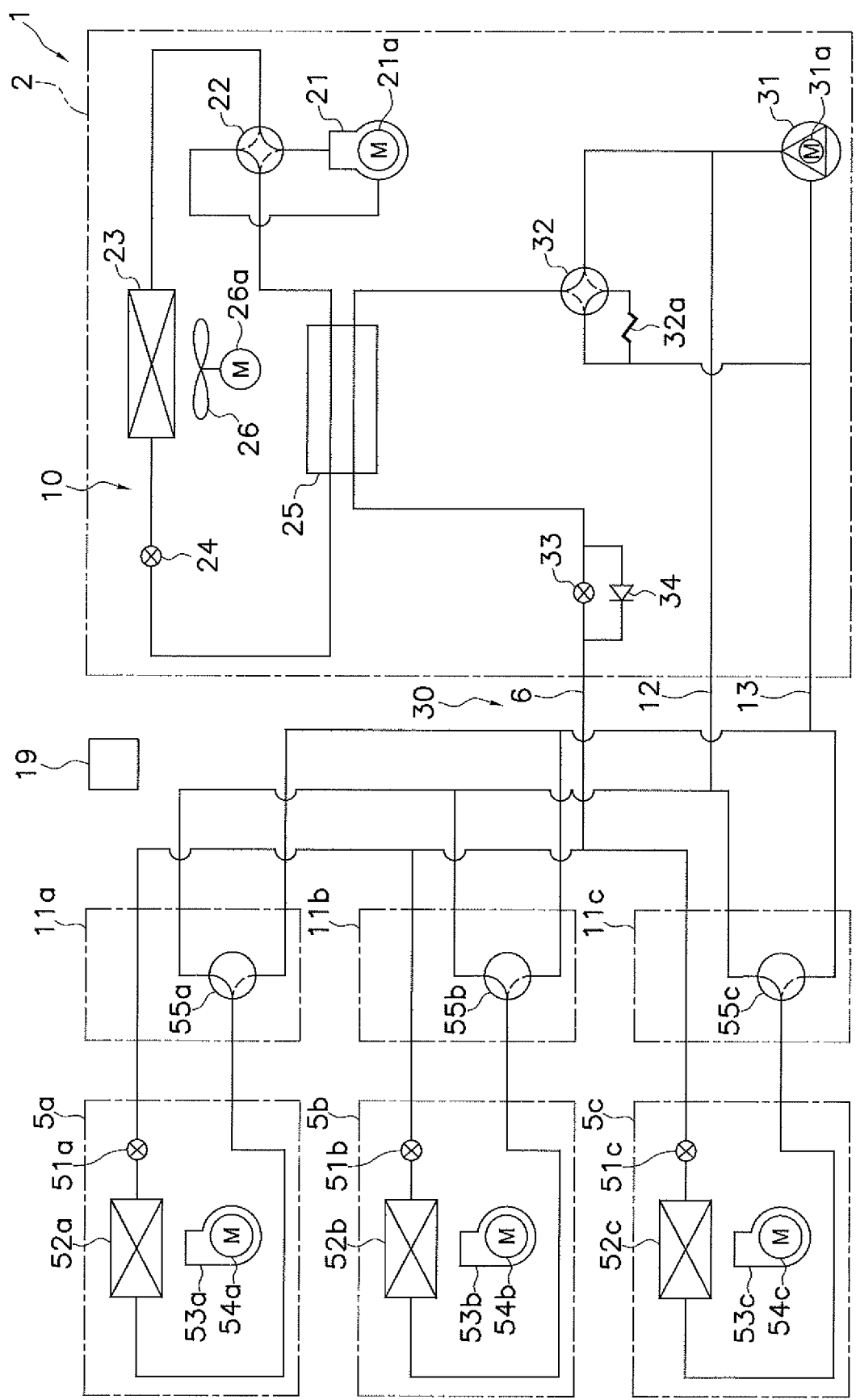
FIG. 18 is a schematic configuration diagram of a heat transport system according to one or more embodiments of the present invention.

Likewise, in one or more embodiments, although detailed description will be omitted, similar to the above-described embodiments, the check valve 34 that allows only the flow of the heat transfer medium from the liquid heat transfer medium side of the medium heat exchanger 25 to the liquid medium communication pipe 6 may be provided in the medium circuit 30 so as to bypass the heat source side medium decompressor 33 (refer to FIG. 18).

Figure 19:
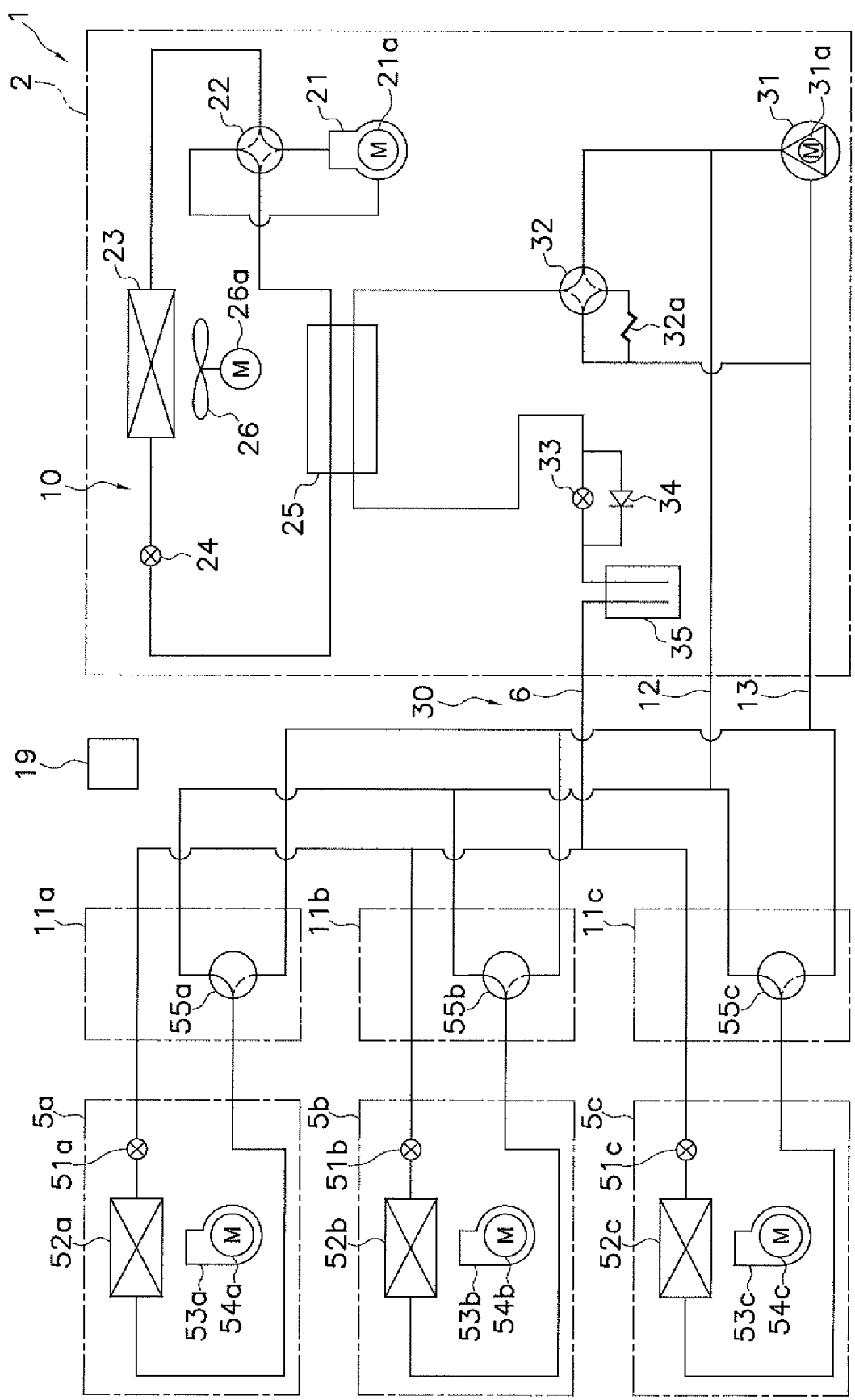
FIG. 19 is a schematic configuration diagram of a heat transport system according to one or more embodiments of the present invention.

Likewise, in one or more embodiments, although detailed description will be omitted, similar to the above-described embodiments, the receiver 35 for storing the heat transfer medium circulating through the medium circuit 30 may be provided on the liquid heat transfer medium side of the medium heat exchanger 25 (refer to FIG. 19).

Figure 20:
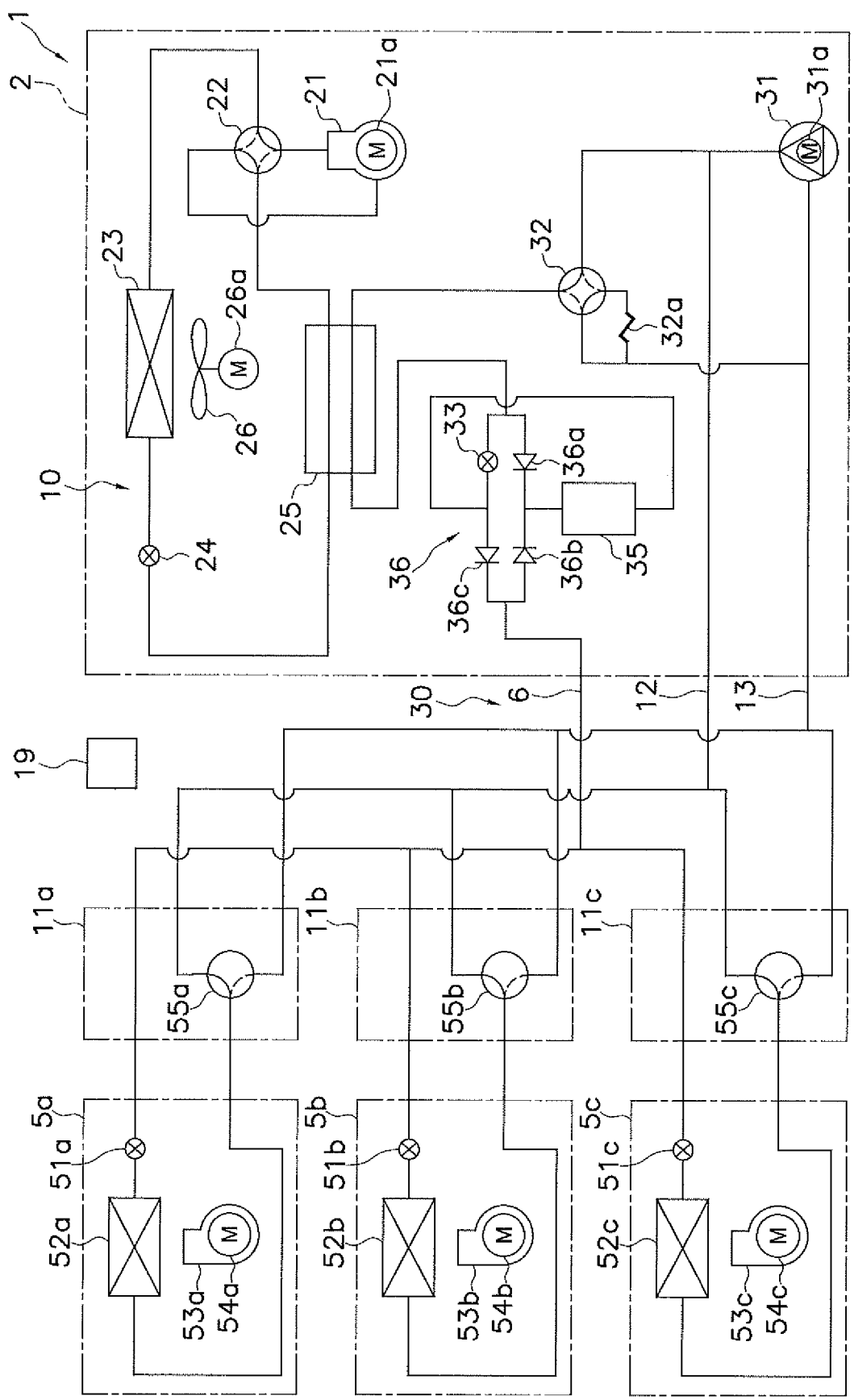
FIG. 20 is a schematic configuration diagram of a heat transport system according to one or more embodiments of the present invention.

Although detailed description will be omitted, when providing the receiver 35 on the liquid heat transfer medium side of the medium heat exchanger 25 as in the above-described embodiments, the receiver 35 may be provided via the bridge circuit 36 (refer to FIG. 20).

Figure 21:
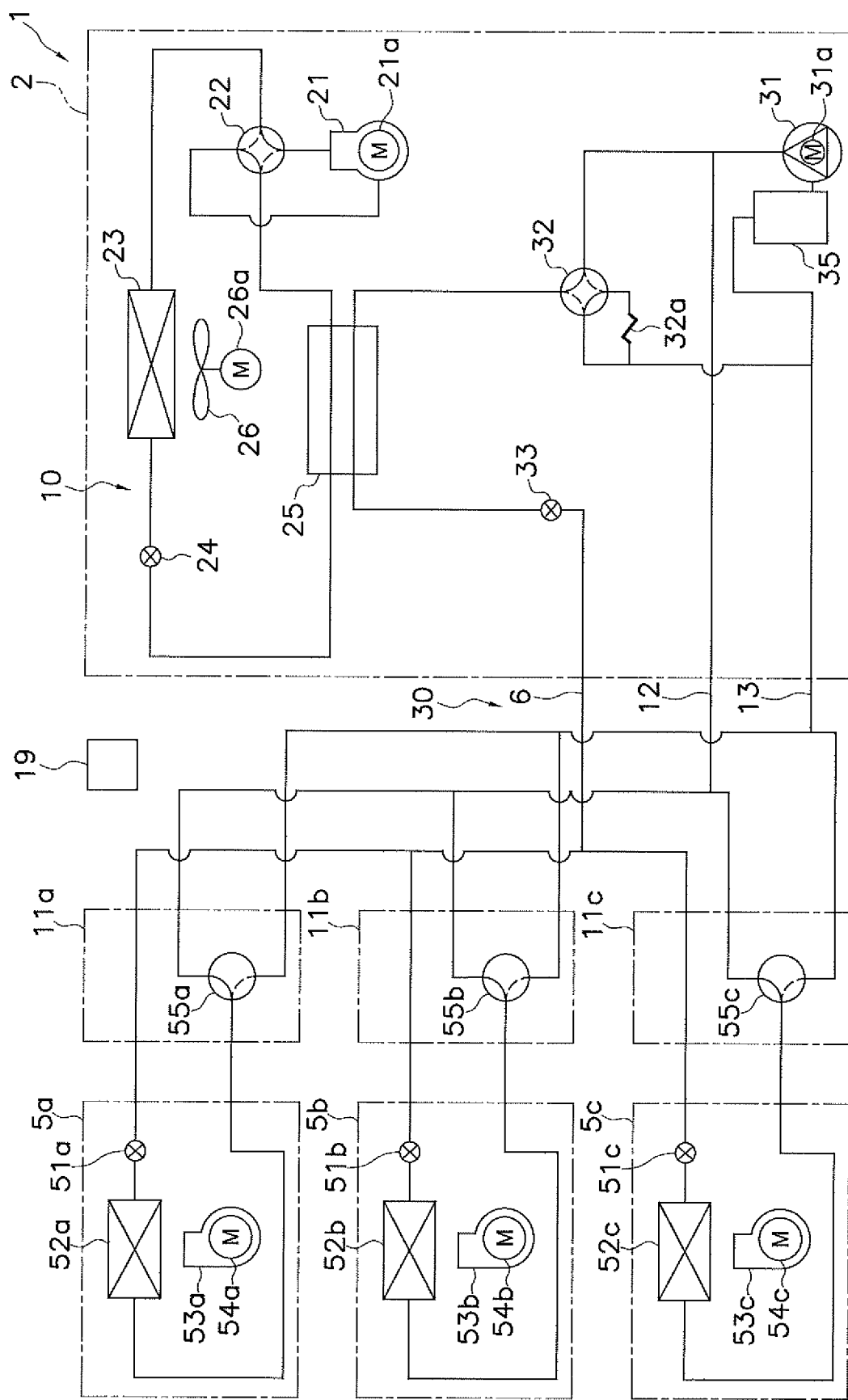
FIG. 21 is a schematic configuration diagram of a heat transport system according to one or more embodiments of the present invention.

Although detailed description will be omitted, when providing the receiver 35 in the medium circuit 30 as in one or more embodiments, similar to the above-described embodiments, the receiver 35 may be provided on the suction side of the medium booster 31 (refer to FIG. 21).

The present invention is widely applicable to a heat transport system including a refrigerant circuit through which refrigerant circulates and a medium circuit through which a heat transfer medium circulates for performing air conditioning of a room by performing heat exchange between the heat transfer medium and indoor air.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A heat transport system comprising:
    a refrigerant circuit that seals therein a fluid comprising HFC-32 and/or HFO refrigerant as a refrigerant and that comprises:
        a refrigerant compressor that boosts the refrigerant;
        an outdoor air heat exchanger that exchanges heat between the refrigerant and outdoor air;
        a medium heat exchanger that is a plate type or double plate type heat exchanger that exchanges heat between the refrigerant and a heat transfer medium; and
        a refrigerant flow path switch that switches between a refrigerant radiation state and a refrigerant evaporation state, wherein
            in the refrigerant radiation state, the outdoor air heat exchanger functions as a radiator of the refrigerant and the medium heat exchanger functions as an evaporator of the refrigerant, and
            in the refrigerant evaporation state, the outdoor air heat exchanger functions as an evaporator of the refrigerant and the medium heat exchanger functions as a radiator of the refrigerant; and
    a medium circuit that seals carbon dioxide therein as the heat transfer medium, wherein the medium circuit comprises:
        a medium compressor that boosts the heat transfer medium;
        the medium heat exchanger;
        a first medium flow path switch that switches between a first medium radiation state and a first medium evaporation state, wherein
            the medium heat exchanger functions as a radiator of the heat transfer medium in the first medium radiation state and as an evaporator of the heat transfer medium in the first medium evaporation state; and
        indoor air heat exchangers that exchange heat between the heat transfer medium and indoor air.

2. The heat transport system according to claim 1, wherein a pipe diameter of a pipe that constitutes the medium circuit is ⅜ inch or less when a rated capacity of the heat transport system is 5 horsepower or less.

3. The heat transport system according to claim 1, wherein the refrigerant circuit, the medium compressor, and the first medium flow path switch are disposed in an outdoor unit, and
one of the indoor air heat exchangers is disposed in an indoor unit.

4. The heat transport system according to claim 3, wherein the outdoor unit comprises:
    an air cooling unit that comprises the refrigerant circuit; and
    a heat source unit that comprises the medium compressor and the first medium flow path switch.

5. The heat transport system according to claim 1, wherein the medium compressor comprises a motor whose rotation speed is controlled by an inverter.

6. The heat transport system according to claim 1, wherein the medium compressor is a rotary compressor.

7. The heat transport system according to claim 1, wherein the medium compressor is an oil-less turbo compressor.

8. The heat transport system according to claim 1, wherein the medium circuit further comprises:
    a receiver that stores the heat transfer medium that circulates in the medium circuit.

* * * * *